United States Patent [19]
Allen et al.

[11] Patent Number: 5,546,557
[45] Date of Patent: Aug. 13, 1996

[54] SYSTEM FOR STORING AND MANAGING PLURAL LOGICAL VOLUMES IN EACH OF SEVERAL PHYSICAL VOLUMES INCLUDING AUTOMATICALLY CREATING LOGICAL VOLUMES IN PERIPHERAL DATA STORAGE SUBSYSTEM

[75] Inventors: Vincent K. Allen; Robert S. Goncharsky; Richard A. Ripberger, all of Tucson, Ariz.

[73] Assignee: International Business Machines Corporation, Armonk, N.Y.

[21] Appl. No.: 75,936

[22] Filed: Jun. 14, 1993

[51] Int. Cl.$^6$ .................................. G06F 13/24
[52] U.S. Cl. .................. 395/438; 395/404; 395/823; 369/34; 364/247.3; 364/248.1; 364/248.2; 364/DIG.1
[58] Field of Search ................... 395/275, 425, 395/600, 650, 438, 404, 823; 369/34

[56] References Cited

U.S. PATENT DOCUMENTS

| | | | |
|---|---|---|---|
| 4,310,883 | 1/1982 | Clifton et al. | 395/600 |
| 4,393,445 | 7/1983 | Milligan et al. | 360/72.2 |
| 4,430,727 | 2/1984 | Moore et al. | 395/442 |
| 4,837,680 | 6/1989 | Crockett et al. | 395/284 |
| 4,989,191 | 1/1991 | Kuo | 369/33 |
| 5,018,060 | 5/1991 | Gelb et al. | 395/600 |
| 5,129,088 | 7/1992 | Auslander | 395/700 |
| 5,163,134 | 11/1992 | Kakuse et al. | 395/823 |
| 5,197,055 | 3/1993 | Hartung et al. | 369/34 |
| 5,210,866 | 5/1993 | Milligan et al. | 395/182.04 |
| 5,239,650 | 8/1993 | Hartung et al. | 395/650 |
| 5,283,875 | 2/1994 | Gibson et al. | 395/404 |
| 5,287,500 | 2/1994 | Stoppani, Jr. | 395/600 |
| 5,327,535 | 7/1994 | Oguta et al. | 395/440 |

OTHER PUBLICATIONS

"MS–DOS operating system", pp. 149–160, 1991.
"Introduction to IBM Direct Access Storage Device." 1990, pp. 5–8 to 5–9.
"Dictionary of Computing", 1987, pp. 276, 462–464.
"Isol IEC 10288" pp. 194–204.

*Primary Examiner*—Thomas C. Lee
*Assistant Examiner*—Moustafa Mohamed Meky
*Attorney, Agent, or Firm*—M. W. Schecter; D. A. Shifrin; H. F. Somermeyer

[57] ABSTRACT

A peripheral data storage subsystem has means for responding to a MOUNT command received from a host processor to create and mount a host-processor-addressable logical data-storage volume. Such logical data-storage volume has a serial number VOLSER indicated in the MOUNT command. The logical data volume is assigned a predetermined area of a physical data volume, such area being termed a partition. The illustrated embodiment shows a tape subsystem in which the partitions are accessed by a control using a reel tachometer that identifies segments of the tape. Each partition has a number of the tape segments. Controls and methods are described for initializing the subsystem for effecting the automatic volume creation, appending data into a logical volume, how logical volumes are made to be portable, moving logical volumes amongst diverse physical media, tape formats usable for such logical volumes, data base control of the logical volumes and volume creation processing. The physical volume in which one or more logical volumes reside is not host-processor addressable. Some physical volumes are ejectable from the data storage subsystem. The physical volumes storing the logical volumes are not ejectable. To eject a logical volume, it is copied from the storing physical volume to an ejectable physical volume.

65 Claims, 11 Drawing Sheets

BOV - BEGINNING OF VOLUME
LBOV - LOGICAL BEGINNING OF VOLUME
LEOV - LOGICAL END OF VOLUME
PEOV - PHYSICAL END OF VOLUME
FID - FORMAT IDENTIFICATION BLOCK

BOP - BEGINNING OF PARTITION
LBOP - LOGICAL BOP
EOP - END OF PARTITION
LEOP - LOGICAL EOP

FIG. 5
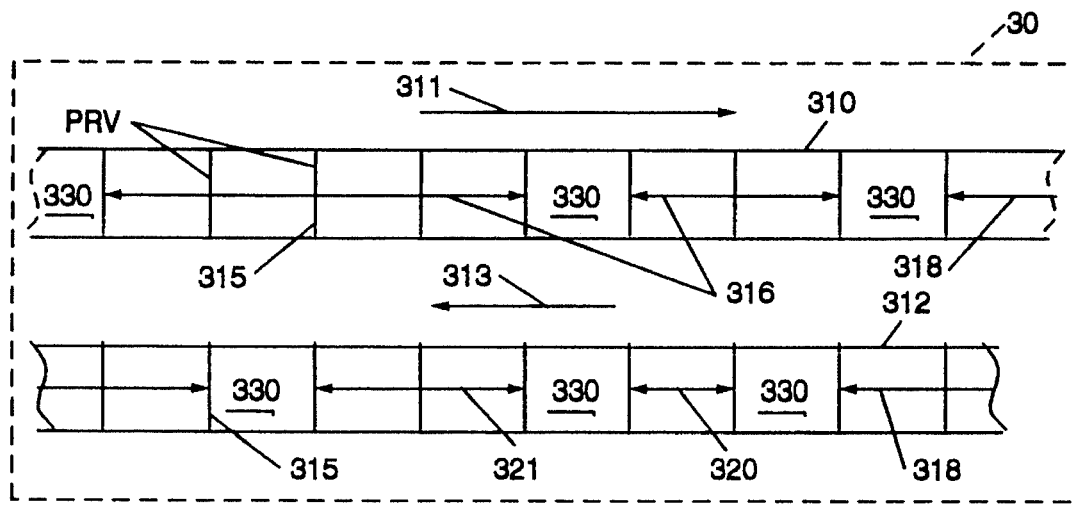
FIG. 7
PVP PORTION OF DATA BASE
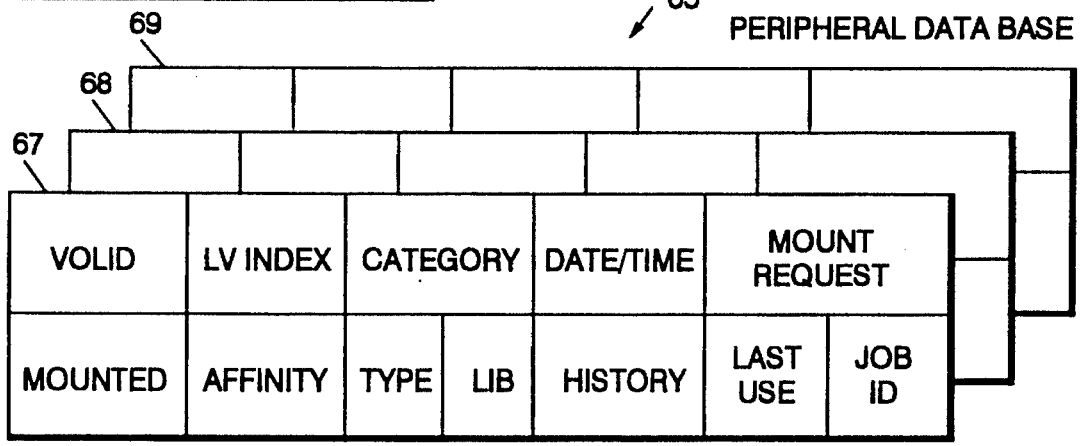
PERIPHERAL DATA BASE
LV PORTION OF DATA BASE
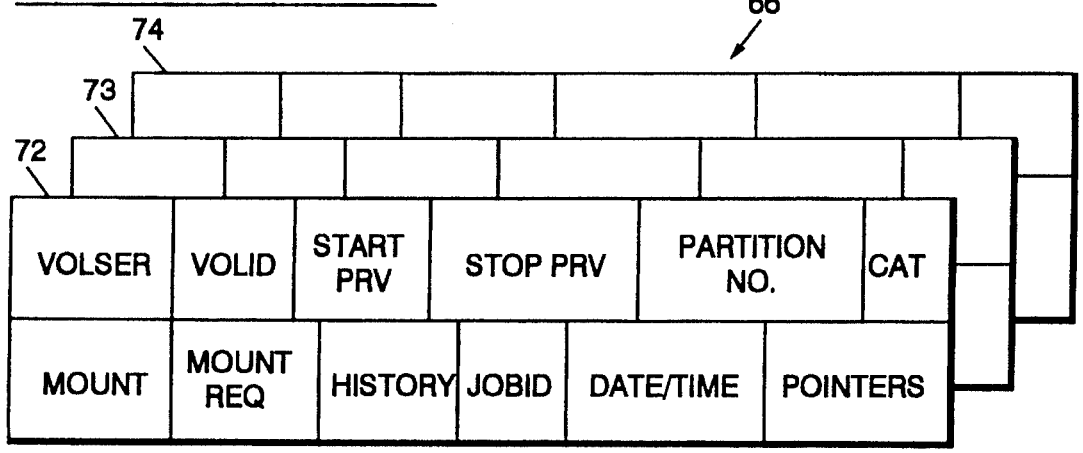

VOLUME RANGE

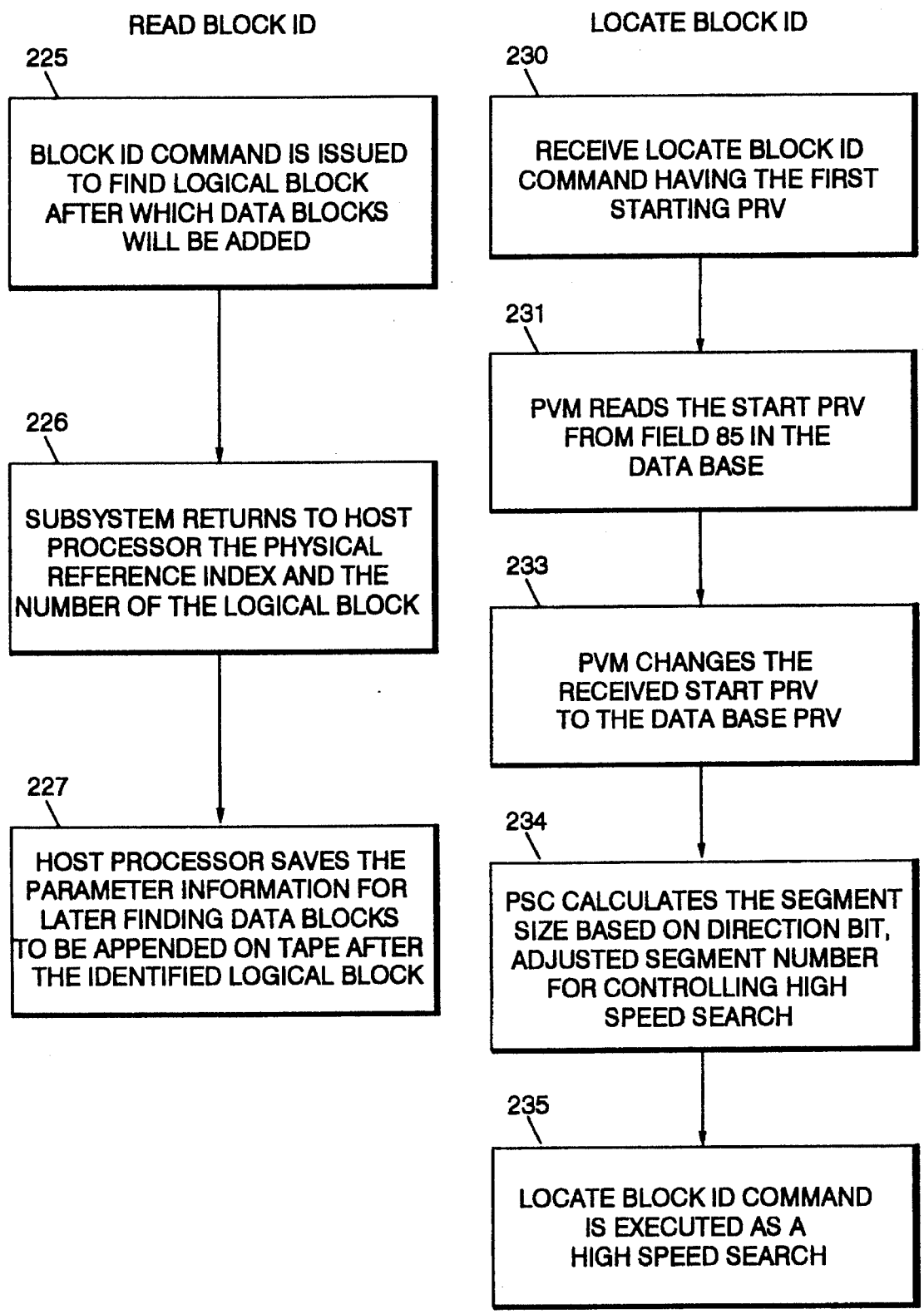

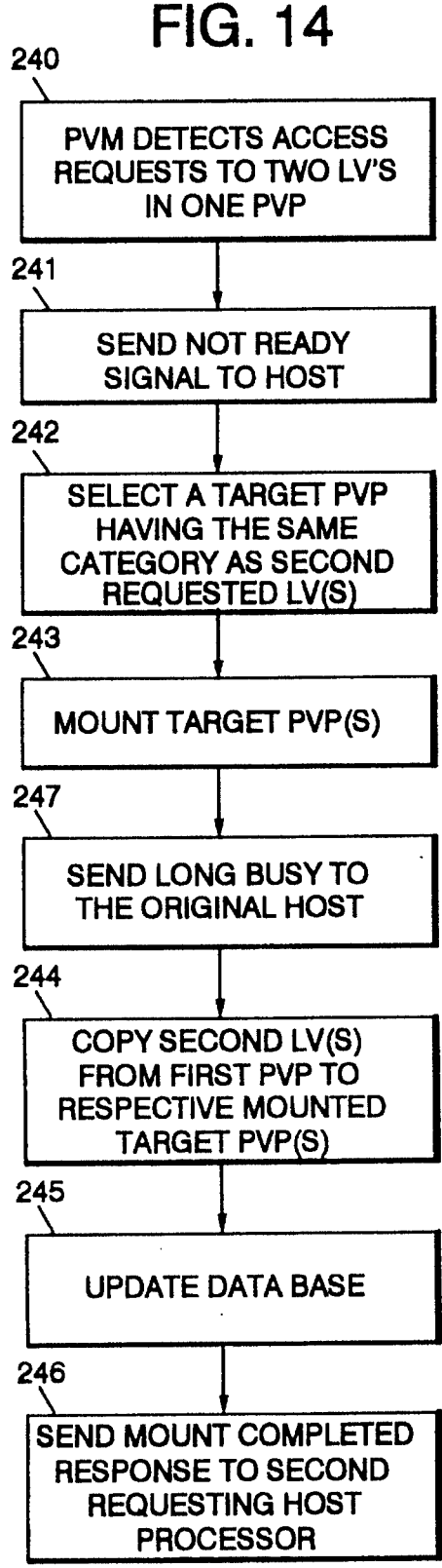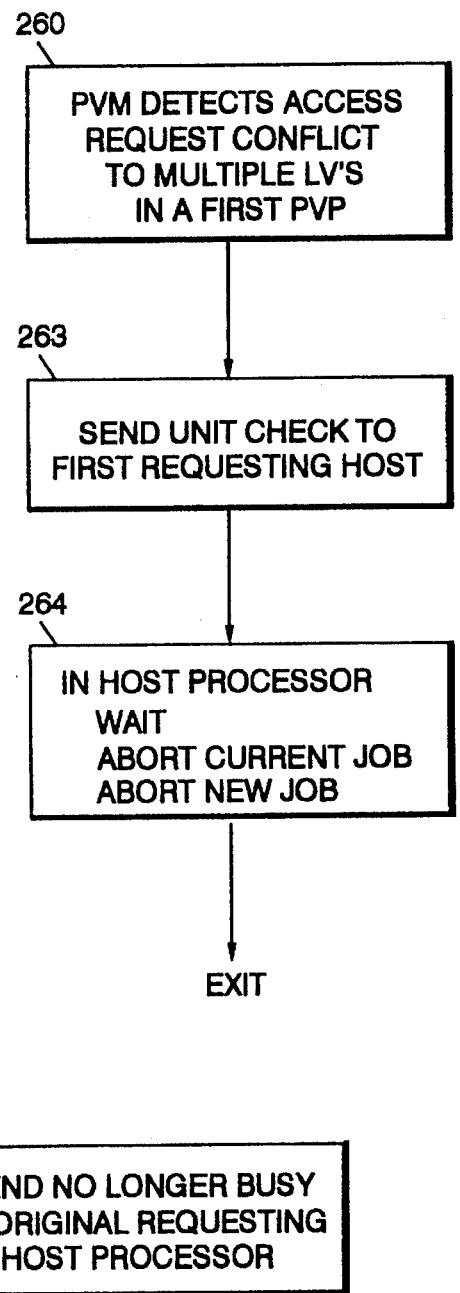

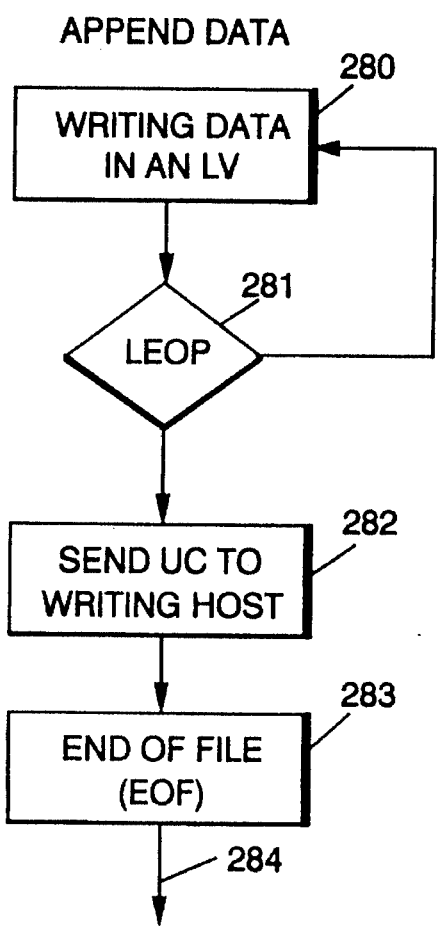
FIG. 17
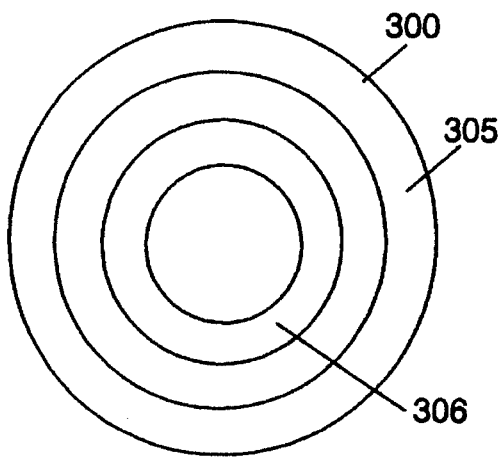
FIG. 18
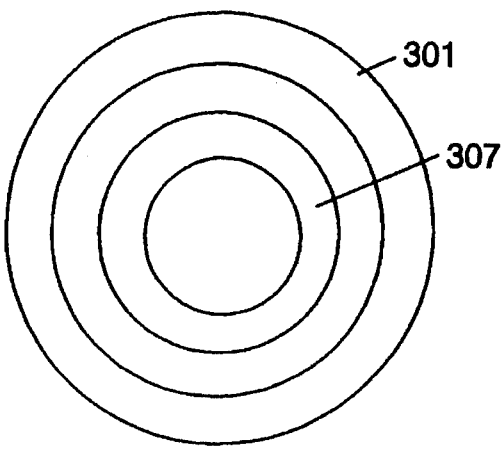
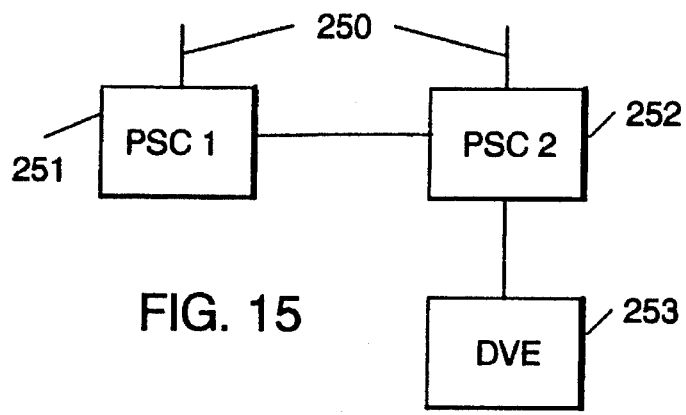
FIG. 15

SYSTEM FOR STORING AND MANAGING PLURAL LOGICAL VOLUMES IN EACH OF SEVERAL PHYSICAL VOLUMES INCLUDING AUTOMATICALLY CREATING LOGICAL VOLUMES IN PERIPHERAL DATA STORAGE SUBSYSTEM

DOCUMENTS INCORPORATED BY REFERENCE

Clifton et al U.S. Pat. No. 4,310,883 is incorporated for its showing of a host processor allocating data storage space in a virtual volume selected from a group of such virtual (logical) volumes.

Gelb et al U.S. Pat. No. 5,018,060 is incorporated for its showing of a host processor using automatic storage class selections for enabling enhanced data storage volume selection in allocating data storage space in a data storage volume for a data set.

Milligan et al U.S. Pat. No. 4,393,445 is incorporated by reference for its showing of a peripheral data-storing tape subsystem in which the subsystem generates and uses physical reference values (PRV's) useful for rapidly accessing blocks of data stored in any one of a plurality of magnetic tapes.

Co-pending commonly-assigned application for patent by Kulakowski et al Ser. No. 07/816,590, filed Jan. 3, 1992, now U.S. Pat. No. 5,303,214 is incorporated by reference for its teaching of affine groups of data sets and data storage volumes, logical or physical, in a multi-media automatic media library data-storing subsystem.

FIELD OF THE INVENTION

This invention relates to peripheral data storage subsystem, more particularly to such subsystems that can automatically create data-storing logical or virtual volumes and the management of such volumes without any or a minimal host processor intervention.

GLOSSARY AND DEFINITIONS OF TERMS

The following terms are used in this document:

A data storage volume or volume is a unit of a data storage medium that is separately addressable and is identified by a volume identifier. As used below, only for the purpose of consistency in terminology, the volume identifier for a logical volume is termed VOLSER while the volume identifier for a physical volume is termed VOLID. In the prior art VOLSER and VOLID have been used interchangeably. To effect access to data storing locations in a volume, a host processor requests that an addressed volume be mounted in an addressed device for accessing data storage space of such volume.

A physical volume is a volume that is always a physical package, such as a tape cassette or cartridge, a disk cartridge, and the like. Each physical volume is independently mountable into a device to provide access by a host processor to its data storage space. In the prior art, such physical volumes are directly addressable by the host processor. In practicing this invention, a plurality of logical volumes (LV) are located in, but transportable from, a physical volume. To access data storage space in a physical volume having LVs, only the LVs are addressed by a host processor. This physical volume is not separately directly addressable by a host processor. The volume identifier VOLID on a physical volume is readable by a human being. In the prior art data storage, the VOLID is repeated internally in the physical volume as a machine-readable copy of the VOLID. Each LV has an internally stored VOLSER that identifies it as a data storage volume.

A logical volume is a data storage volume that is addressable by a host processor independently of which physical volume is storing it. The volume identifier VOLSER of each logical volume is independent of the physical volume identifier VOLID and is usually not externally available on the physical volume.

A physical volume - - - partitioned (PVP) is a physical volume that is divided into a plurality of physically-identifiable partitions, each partition is logically co-extensive with a single logical volume. That is, one partition has one logical volume that may or may not completely occupy the one partition. The medium physical locations in the physical volume are addressable by means external to the physical volume as addressable segments. Each partition/logical volume consists of an integral number of contiguous segments. Partitions may be of fixed length or variable length. An unpartitioned volume is a physical volume that has one partition. Such a physical volume is termed as being physical only or PVO.

A partition is a portion of a physical volume that is machine-identifiable either by machine-sensible marks on a medium constituting the physical volume or by machine-sensible positions (with or without marks on the medium) of such medium. For sensing machine-sensible positions of a tape physical volume, as shown in Milligan et al, supra, a tachometer of a tape drive that mounts a tape physical volume measures tape displacement of the tape in the tape volume past a transducer for enabling machine sensing the current portion of the tape being scanned by the transducer in the tape drive. For interchange of each tape physical volume between diverse tape drives, appropriate tape-motion tolerances are accommodated in defining partitions of each tape. A partition is not directly nor explicitly addressable by the host processor in a PVP, only the LV is addressable.

| GLOSSARY of ACRONYMS | |
|---|---|
| ACL | Automatic Cartridge Library |
| ACS | Automatic Class Selection |
| ATL | Automatic Tape Library |
| CAR | Concurrent or conflicting Access Requests |
| Category or CAT | Code assigned to a PV, VV or LV defining an attribute of the respective volume |
| FID | Format Identification |
| FSID | Format Segment Identification |
| HDR1 | Contains the VOLSER the LV, in a STACK category PVP or an empty LV, HDR1 contains a specific code indicating that the volume contains no data. |
| I/O | Input-Output |
| LBOP | Logical Beginning of Partition |
| LBOT | Logical Beginning of Tape |
| LBOV | Logical Beginning of a Volume (PV, VV or LV) |
| LEOP | Logical End of Partition |
| LV | Logical Volume |
| PBOP | Physical Beginning of Partition |
| PBOT | Physical Beginning of Tape |
| PEOP | Physical End of Partition |
| PEOT | Physical End of Tape |
| PRV | Physical Reference Value of a tape physical volume, used to identify locations of LV's in a PVP. This quantity is also term a Physical Reference Index (PRI). |
| PVO | Physical Volume -- Only (one addressable volume as in the prior art. |
| PVP | Physical Volume -- Partitioned into logical |

| | GLOSSARY of ACRONYMS |
|---|---|
| | volumes LV |
| Segment | The physical portion of a tape that is addressable by a tachometer on a tape drive spool |
| Segment No. | The PRV value that enables addressing a logical volume by segment |
| SEGNO | Segment number (see Segment No.) |
| VOL1 | Contains the VOLID for the PV |
| VOLID | Physical Volume Identification |
| VOLSER | Volume Identification (serial number) for a virtual or logical volume |

BACKGROUND OF THE INVENTION

The average size of data sets in most computer or data processing centers is significantly less than the capacity of tape or optical data-storing disk volumes. Also, most programming support for peripheral data storage subsystems does not provide a general solution to storing multiple data sets in the same volume, particularly tape volumes. Consequently, the potential capacity of tape storage is often not realized because a single small data set is stored in one tape volume leaving the remainder of the volume unused.

With the advent of automated tape libraries (ATL), the cost of this unused storage includes, not only the percentage of the volume which is not utilized, but also the cost of storing that unused medium in the ATL. Tape products and their associated software support which develop mechanisms which can fully utilize volume capacities will, in general, have a significant competitive advantage over comparable products which cannot fully utilize volume capacity.

One possible mechanism to better utilize the capacity of a tape volume is to store multiple volume images, virtual or logical volumes (LV), on a single physical volume. For better utilization of data-storage space, the data which would have been stored in multiple, mostly unused, physical volumes are collected into a single physical volume. Such data, in accordance with this invention, are stored in separately addressable host-processor defined logical data storage volumes. Access to the first byte of data in such logical or virtual volumes may be slower than the access to a first byte of data in a single physical volume. In the logical volume case the beginning of the logical volume is generally somewhere away from the normal tape loading point. This fact means that before the first byte of data in a logical volume is accessible, not only is the physical volume mounted but the logical volume has to be found by moving the tape to place the logical volume at the tape transducer. Also, concurrent conflicting access requests to multiple logical volumes residing on the same tape have to be resolved.

It is also desired that the host processor and/or personnel operating the host processor have no activities that relate to storing a plurality of volumes of data in one physical volume. In the prior art, manual control is required for creating or establishing a defined or requested data storage volume. It is desired to limit the required manual steps to merely defining each desired volume and for inserting scratch physical volumes into an ATL or open shelf storage.

The benefits of this enhanced capacity utilization without host processor nor personnel involvement greatly simplifies and obviates the need for personal attention to a data storage system. However, these benefits come at the expense of creating additional problems which must be handled, that is:

The volume image is no longer externally identifiable such that some component of the host/library system must maintain a mapping of logical volumes to physical volumes. This mapping information is a critical system assist which must be highly available, highly reliable, and disaster recoverable.

Logical volumes in a same mounted physical data storage volume are not concurrently accessible. When there are requests to simultaneously mount a plurality of logical volumes stored in a same physical volume, either all but one of the mounts must be deferred, possibly creating a data processing deadlock. An alternative is to move all but one of the logical volumes from the one physical volume to other physical volumes. If a data movement solution is chosen, access to any data on the one physical volume is delayed while the copies are made. This solution may not always be practical for many data processing environments.

Access to the first byte of data stored in a physical tape volume may be slower than if but one logical volume is stored in each physical tape volume. That is, since the beginning of any logical volume is usually displaced from the normal loading point, the tape has be to moved to position the beginning of a logical volume at the tape drive transducer or head.

Depending on how data storage space is managed for logical volumes (each addressable logical volume is stored in a "partition" in a physical volume), the size (number of data bytes) of a logical volume (data storage space required for a logical volume must accommodate volume size) can be expected to be unpredictable. One solution is to prevent appending data to data currently stored in a logical volume that is "full". Such partitions as used herein, are logically co-extensive with logical volumes. High speed searches on the tape are based on segments or position reference values (PRVs), as will become apparent and as set forth in Milligan et al, supra. Some prior art documents use the term "partition" in a same vein as the term "segment" is used herein.

To solve the above-stated problems, as well as other problems, using current day data storage management practices requires an undue attention to assignment and storage of data using the logical volume approach. It is desired that the current practices in host processors and manual procedures required by attending personnel not be made cumbersome. Therefore, it is desired to provide mechanisms and methods for storing a plurality of logical data storage volumes in one physical data storage volume wherein the data management activates in a host processor and of the attending personnel do not change for defining volumes. It is desired to eliminate the current need for defining and assigning which physical data storage volume is to be used for storing any given logical volume and to eliminate a current need for assigning a physical volume for storing data before that data are sent to a data storage system. In other words, the management of data storage volumes is transparent (not seen) by either the host processor nor its attending personnel.

DISCUSSION OF THE PRIOR ART

Clifton et al in U.S. Pat. No. 4,310,883 describe a mass storage system wherein one disk volume (IBM 3330 disk volume) was emulated by two tape cartridges in an automatic cartridge library (ACL). The disk volumes are termed "virtual volumes" even though the system is a one-for-one emulation of two tape cartridges for each disk volume. Clifton et al host processor automated emulated disk volume selection using a best fit detector. All emulated disk volumes were established by manual actuation of the system before the Clifton et al automated volume selection could be invoked. The emulated disk volumes are grouped into so-called volume groups. Clifton et al grouped virtual volumes into "volume groups" by user (manual selection, input to the primary host processor) chosen criteria. Such criteria are application area, common retention period and space allocation quantities. One volume group could not be subordinated to another volume group. A best fit volume selection criterion included several volume attributes, such as volume expiration date being later than a data set expiration date, available free space and the like. Once each data set is assigned to a given emulated disk volume, allocation and storage activities ensued.

Gelb et al in U.S. Pat. No. 5,018,060 extended the automation of volume selection started by Clifton et al. Gelb et al provide for inferred or implicit automatic volume selection based upon three data/volume defining class attributes. A DATA class includes user defined data attributes. A STORAGE class defined user inputted performance and other storage related parameters, viz capacity, access time etc. A user defined MANAGEMENT class related to scratching volumes and data sets and the like. The three classes are used to select a volume identified in one or more STORAGE groups of volumes. A primary purpose of Gelb et al apparently is to automatically assign data sets to data storage volumes based on established criteria (classes) that use inferences or hints identifying the data set to select a data storage volume. Gelb et al, like Clifton et al, use already established volumes based on manual actuation of the system to recognize such physical or emulated volumes.

The IBM Technical Disclosure Bulletin, Vol 35, No. 5 October 1992, pp 17–20, describes improving data-storage volume management by using categories. A category is defined for including data-storage volumes having a common attribute. Such common attributes include scratch volumes, expiration dates, common user, type of volume, host-processor data related to a job or a set of Jobs, volumes to be transferrer or migrated to a scratch category, and the like. A mount by category is indicated as mounting any volume that is a member of a category. One example is mounting one volume from a scratch category.

Co-pending commonly-assigned application Kulakowski et al Ser. No. 07/816,590, filed Jan. 3, 1992, now U.S. Pat. No. 5,303,214 shows an automatic media library subsystem that uses an affinity characteristic for managing data-storage volumes. That is, those data-storage volumes storing data that have a predetermined functional relationship (host processor determined) have an affinity. Affinity classes are established. Cartridges that are members of a same affinity class must be entered and exited from the library as a unit. The storage location of the cartridges having such an affinity is preferably in close physical association in the library storage compartments. It is desired to extend the Kulakowski et al affinity control for better managing logical volumes having such an affinity for enhancing accessing the various logical volumes depending on the nature of the affinity.

The terms "virtual volume" and "logical volume" have been used to denote identifying a portion of a storage medium as an addressable entity. Also, the term "minidisk" has been used to mean "virtual disk". All of this usage has required a manual actuation of the data processing system to establish each and every such logical volume or disk. That is, no automatic means have been shown for automatically creating or establishing a logical volume LV or logical disk.

The DICTIONARY OF COMPUTING, IBM, Eight Edition, 1987, pp 276 and 462–464 define some of the terms listed above. The term "minidisk" on page 276 includes the synonym of "virtual disk". The term "virtual disk" is defined on page 462 as being either a so-called RAM disk (in main storage) or a "logical subdivision of, a physical disk storage device that has its own address, consecutive storage space for data, and an index or description of stored data so that the data can be accessed." Again, each and every one of such "virtual disks" are individually established via a separate manual actuation of the data processing system.

An example of manually actuating a data processing system for establishing a virtual disk or a minidisk is set forth in the Microsoft MS-DOS User's Guide and Reference, Version 5.0, 1991, in pages 149–160. These pages describe a DOS utility program FDISK provides an operator interface for establishing "virtual disks". That is, one physical disk is divided into a manually indicated number of "partitions", each partition being addressable as a separate virtual disk. The program is usually used for disks that are not removable.

Milligan et al in U.S. Pat. No. 4,393,445 show generating a physical reference value (PRV) based upon tape displacement past a transducer. Such PRV's are not separately indicated on the tape. Rather, spool rotation is used to measure tape displacement for identifying the PRV numbers. According to Milligan et al, such PRV numbers are usable by a host processing to quickly move to a desired tape displacement position (locate recorded data blocks) or for error recovery purposes. Milligan et al also teach that a PRV is usable for indicating status of a data buffer that stores data to be either written to or has been read from a magnetic tape. Such PRV values respectively denote reference points on a magnetic tape that are generated and indicated by means not on the tape, i.e. there are no marks showing such PRV's on the tape. The present invention uses the PRVs to indicate media segments. One or more segments are combined into a logical volume that is said to occupy one "partition" on the storage medium, i.e. one partition as that term is used to "partition" hard disks used with DOS and OS/2 operating systems.

A proposed Small Computer Standard Interface (SCSI) standard, ANSI document ISO/IEC 10288 - - - ANSI X3.131:1992R, Nov. 16, 1992, in pages 190–204 describes partitions on a magnetic tape. Such partitions are comparable to "segments" described herein, i.e. physical portions of the tape that are addressable by means external to the tape (enable the tape to be transported in a high speed positioning operation without contact with the tape). Such high speed positioning, as taught by Milligan et al, supra, is preferably a tachometer on a reel mount in a tape drive. Section 10.1.3 (page 192) of the ANSI document describes a proposed standard for "partitions within a volume". Partitions, sic segments, consist of one or more non-overlapped tape areas. Each partition (segment) has its own beginning and ending points. In each magnetic tape volume (one reel of tape), every partition has a defined beginning-of-partition (BOP x), an early-warning position (EW x) and an end-of-partition (EOP x), where x is the partition number. The partition (segment) numbers need not be recorded on the medium. Milligan et al do not mention the early-warning or end-of-partition format blocks. For interchange, information about which partitions (segments) are present in a magnetic tape volume may be stored in the volume in a device-defined area or such information may be an intrinsic attribute of device implementation. What such information consists of is not defined in the SCSI document. That is, the standard does not address how such partitioning could or should be accomplished. The SCSI document does indicate that tape movement between partitions (segments) has no stable position, i.e. exact position is not known as the tape transducer and tape are not in contact.

According to the SCSI document, each partition (segment) has logical elements that include host processor (initiator) elements of data and file marks, i.e. usual tape formatting. Each unit of data is stored as a logical block. Logical block storage is in accordance with the format being used in the volume (entire tape, not in logical volumes on the tape). A "setmark" is defined that is a mark superior to file marks, i.e. there may be a plurality of file marks disposed between a pair of spaced-apart setmarks in any partition (segment). The SCSI document does not describe how such partitioning (segmentation) is to be accomplished nor how to manage a subsystem using such partitioning. See Milligan et al, supra.

SUMMARY OF THE INVENTION

The present invention being practiced in a data processing system having a peripheral data storage subsystem causes the subsystem to respond to a MOUNT command received from an attached host processor when no volume exists to be mounted to create or establish a volume, then mount the volume for responding to the MOUNT command. Such volumes can be logical or virtual volumes established in a physical volume, i.e. such as a reel of tape. The subsystems manages the logical volumes (LV's) in relation to the physical volumes using a peripheral data base. Each physical volume can contain a variable number of LV's. For accessing the LV's, physical segments are identified in the physical volume, preferably using PRV's. Each PRV may indicate a boundary between two longitudinally adjacent segments. Each LV constitutes one partition of the physical volume. Each partition consists of one or more, preferably contiguous, segments. The LV's are accessible on a random basis.

Two or more concurrent conflicting access requests for different LV's in the same physical volume are honored by copying one of the LV's to another physical volume. Any one of several methods are employed.

Appending data to an existing LV is monitored and managed to ensure that the data being appended do not unintentionally overwrite data already stored (recorded) in the physical volume. In response to detected possible overwriting, the current writing is aborted, then another LV is selected/created for receiving the data and the data are rewritten into the newly selected/created LV.

It is preferred that the invention be practiced in an automatic library environment. Ejection of LV's from the library is effected by storing the LV in an ejectable physical volume.

Categories, including categories based on affinity characteristics, facilitate volume selection and management. The categories define characteristics that assist management of the data, the LV's and physical volumes.

Diverse media and data-storage track layouts can be used in the physical volumes. The data storage subsystem may contain physical volumes that store data only as a single volume, physical volumes that contain one or more LV's, scratch physical volumes designated for either single volume usage or LV usage. Diverse media, such as magnetic tape, optical tape, magnetic disks or optical disks may be employed, alone or in a mixed media library.

The foregoing and other objects, features and advantages of the invention will be apparent from the following more particular description of preferred embodiments of the invention, as illustrated in the accompanying drawings.

DESCRIPTION OF THE DRAWING

FIG. 5 illustrates, in simplified form, the logical elements of a logical volume in the FIG. 4 illustrated tape format and the use of physical references for locating and identifying multiple logical volumes on a tape including logical volumes in a magnetic tape have a so-called serpentine track layout.

FIG. 7 diagrammatically shows a peripheral data base used in the FIG. 6 illustrated data processing system.

FIG. 13 illustrates locating a host processor addressed block of a logical volume LV recorded in the FIG. 4 illustrated magnetic tape.

FIG. 14 illustrates machine operations of the FIG. 6 illustrated data processing system for accommodating concurrent conflicting requests to a single physical volume for multiple logical volumes recorded or stored therein.

FIG. 15 illustrates, in simplified form an alternate to the FIG. 14 illustrated accommodation to handling multiple concurrent conflicting access requests to a single physical volume for multiple logical volumes recorded or stored therein.

FIG. 16 illustrates, in simplified form, machine operations of the FIG. 6 illustrated data processing system that include execution of host processor software for handling concurrent conflicting requests to a single physical volume for multiple logical volumes recorded or stored therein.

FIG. 17 illustrates, in simplified form, machine operation in the FIG. 6 illustrated data processing system for appending data to data stored in a logical volume and for error control as a logical volume becomes full of data.

FIG. 18 diagrammatically illustrates two optical disks in which the present invention is practiced using the FIG. 6 illustrated data processing system and the illustrated methods and structures shown in FIGS. 2, 7–12 and 14–17.

DETAILED DESCRIPTION

Figure 1:
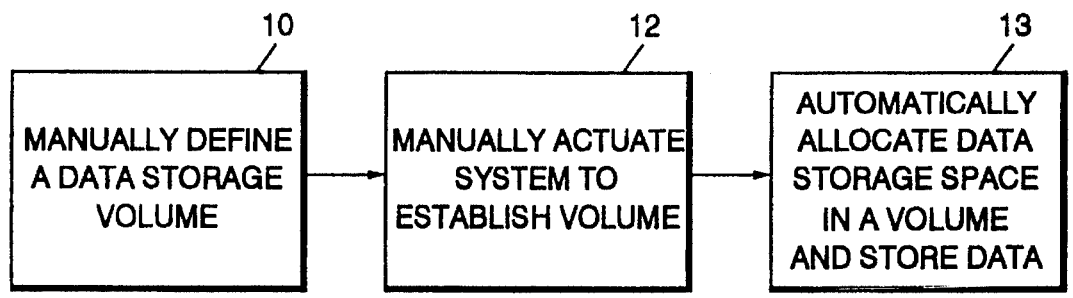
FIG. 1 illustrates known prior art volume creation/establishment methods.

Referring now more particularly to the appended drawing, like numerals indicate like parts and structural features in the various figures. FIG. 1 illustrates a prior art method for creating or establishing volumes, including logical or virtual volumes. Step 10, a manual step, requires that the size of the volume and other desired characteristics and attributes be defined in computer readable form, such as in a unit record card, terminal and the like. This step is like creating a partition on a hard disk of a personal computer or a minidisk in a data processing environment. The manual step 12 is the manually actuated inputting of volume attributes and a command to create or establish a volume. Such creation in data processing environments include a system generation (SYSGEN) step for adding a tape drive, disk drive or other volume (fixed in the drive) to the data processing installation. SYSGEN is a known procedure that is usually effected in slow periods of processing for avoiding unintended interference with usual data processing activities. SYSGEN enables a terminal to identify, one at a type, peripheral equipment to host processors, and the like. The term SYSGEN means "system generation". Once the data storage volume is created/established in the data processor, automatic step 13 allocates data storage space to the created/established volume. The documents incorporated by reference illustrate such automatic allocation procedures.

Figure 2:
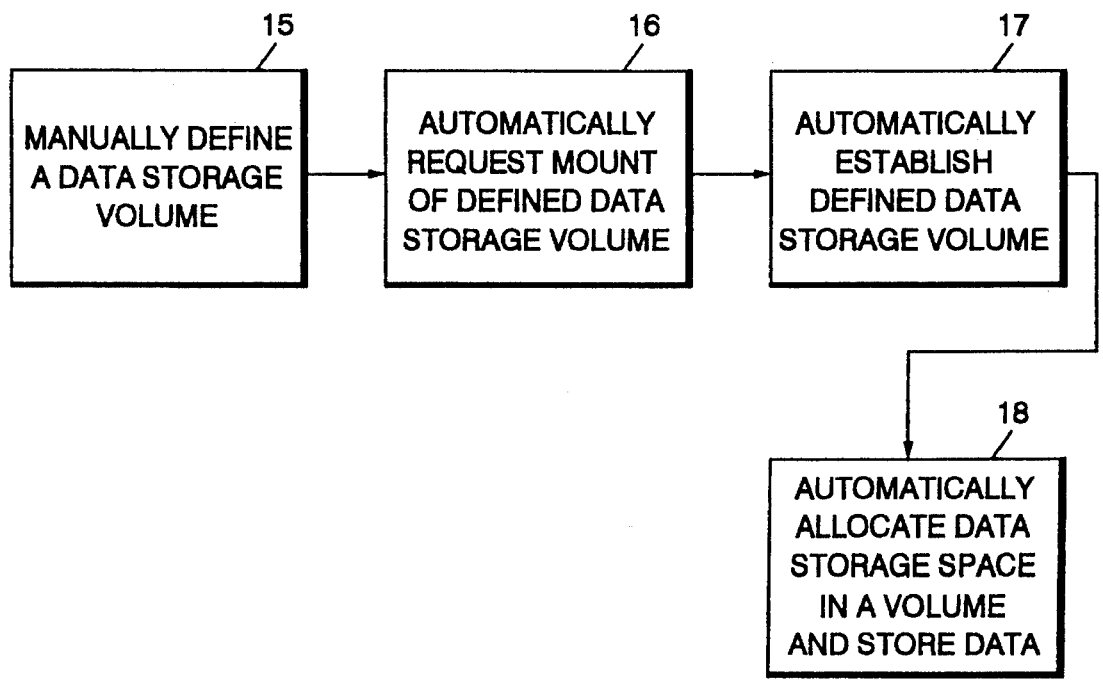
FIG. 2 illustrates a method for the creation/establishment of data storing volumes in accordance with the present invention.

In accordance with one aspect of the present invention, FIG. 2 illustrates automatic creation/establishment of logical data storing volumes. Included in the automatic creation/establishment of a data storing volume is an automatic assignment of a volume serial number (VOLSER) to the defined data storage volume. Both the subsystem and the host processor must have knowledge of such VOLSER's. The procedure includes manual step 15 that is substantially the same as manual step 10, i.e. a data storage volume is defined in a host processor and a VOLSER is selected for the defined data storing volume - - - at this point no actual host processor addressable data storing volume exists. Instead of manually inserting the definition of the data storage volume, all that is required of the user is to automatically (step 16) request (command) a peripheral data storage subsystem to MOUNT the defined VOLSER data storage volume. This automatic step is performed in a usual manner in a host processor connected to the peripheral data storage subsystem. In step 17, the peripheral data storage subsystem automatically responds to the MOUNT request to create/establish a data storage volume having the VOLSER assigned for addressing the data storage volume. Once the data storage volume has been automatically established, automatic step 18, usually performed in a host processor, allocates data storage space in the VOLSER data storage volume as performed in the prior art. Therefore, the attention to details as required in the prior art is removed from manual activity required in the prior art to create/establish an addressable data storage volume.

In a preferred form of the invention, the automatically created/established data storage volumes are logical or virtual volumes, hereinafter termed LV's. As later detailed, the peripheral data storage subsystem is initialized with a range of VOLSER's for facilitating orderly generation of LV's.

The illustrated embodiment of this invention employs magnetic tape physical data storage volumes (PVPs) in which the LV's are created/established. In the host processor accessing or mounting such LV's, the procedures are independent of whether or not the VOLSER has been created/established. That is, the peripheral data storage subsystem responds to a host processor request to mount a data storage volume (herein an LV) to create an LV having a VOLSER indicated in a host processor issued mount command.

Figure 3:
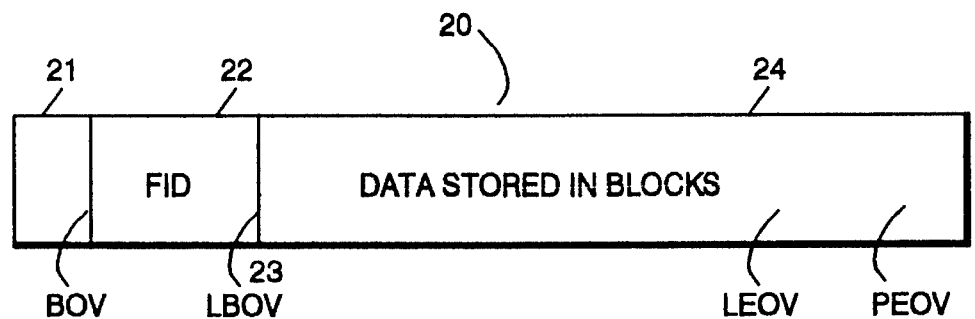
FIG. 3 illustrates a prior art magnetic tape format.

FIG. 3 illustrates a prior art magnetic tape format. Magnetic tape 20 has a so-called system area 21 at a free or leader end of magnetic tape 20. The beginning of the tape volume (BOV) is indicated by a format identification FID 22. FID 22 is typically a non-data pattern that, inter alia, indicates recording density, number of tracks, etc. of the prior art magnetic tape. Boundary 23 of FID 22 marks the logical beginning of volume LBOV. Area 24 of magnetic tape 20 contains the recorded data arranged in physical blocks of data. Logical end of volume LEOV indicates a logical end of the storage portion of area 24. LEOV can be indicated by a mark on magnetic tape 20 or be a PRV, such as shown in Milligan et al, supra. The physical end of volume PEOV indicates the end of the magnetic tape at the hub end portion.

Included in the prior art usage of magnetic tape 20 is the Milligan et al disclosed PRV's based upon a reel tachometer indication of tape displacement from a tape hub (not shown) that enables faster access to the data blocks stored (recorded) in area 24. Such PRV's are also used to define physical segments of magnetic tape 20. Such physical segments are addressable via the reel tachometer counts, all as shown in Milligan et al. Each such segment is bounded by two selected PRV's generated by the reel tachometer. As taught by Milligan et al, a separate tape displacement measurement system may be used. The present invention builds on the teachings of Milligan et al to provide enhanced automatic data storage volume controls using LV's while simultaneously enhancing usage of magnetic tape 20.

Figure 4:
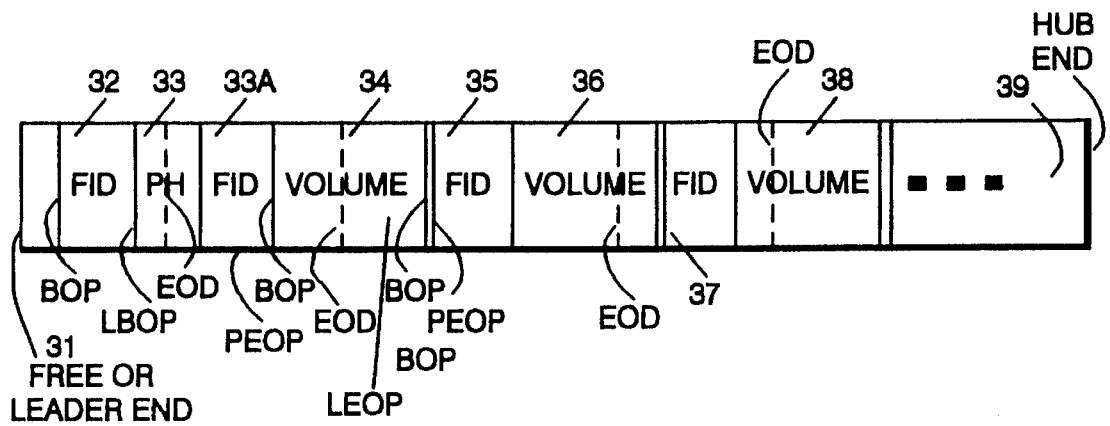
FIG. 4 illustrates, in simplified form, a multi-volume tape format constructed in accordance with the present invention.

FIG. 4 illustrates, in simplified diagrammatic form, an exemplary magnetic tape 30 format employing some described aspects of the present invention. Such format consists of partitions that are each identifiable by the Milligan et al PRV system, each partition comprising one or more of the physical segments. Each partition, other than a later-described first or system partition, stores, i.e. is addressable as an LV, one logical volume. Such partitions are dynamically generated in response to MOUNT commands received from a host processor, as will be further described, for storing one host-processor-addressable LV. Such a tape 30 is termed a "partitioned" or "LV" data storing magnetic tape, hereinafter referred to as a physical volume—partitioned (PVP). The prior art data storing magnetic tape 20 is termed an "unpartitioned" or "physical only" physical volume, hereinafter termed a physical volume only (PVO). Unformatted magnetic tapes destined to become partitioned magnetic tapes (PVPs) are assigned to a "stack" category. These physical volumes are placed in the stack category when they are to be made available to subsystem 48 for "stacking" one or more logical volumes into one physical volume. When a host processor attempts to remove a physical volume from this category, the library causes any active logical volumes on the physical volume to be copied to another PVP. Therefore, one of the categories that PVP's are all assigned is the stack category. Unformatted magnetic tapes destined to become non-partitioned volumes PVO are assigned to an insert category. These categories are necessary as the unpartitioned physical tape volumes PVO must be identified by an VOLID (volume identification) that is both external (visual) and internal (magnetically recorded).

Magnetic tape 30 has system reserved area 30 at the free or leader end of the tape. Since magnetic tape 30 is divided into addressable partitions, each partition storing an LV, as will become more apparent, format identification FID 32 is more extensive in informational content than the prior art FID 22. The leader end of FID 32 is termed "beginning of partition" BOP. The informational content of FID 32 includes whether the partitions on magnetic tape are of fixed or variable in length. PH 33 is a partition defining header that has information as set forth below. The combination of FID 32 and PH 33 completely defines the specific format of magnetic tape 30. FID 32, PH 33 and area 34 constitute a PH 33 partition addressable by subsystem 48 and is not addressable by a host processor. PH 33 preferably includes the information set forth in Table I below:

TABLE I

VOLID of the PVP
PRV's of Partition 0 PBOP and PEOP
PRV's of Partition 1 PBOP and PEOP
PRV's for all partitions 2. . . .N
EOD -- End of Data mark LV's for storing user data (such as in records numbered 1–N, N is a positive integer) are in partitions numbered 0 through N, where N is a positive integer designation of a last partition created for a last LV in the PVP. The second partition, numbered 0 consists of partition FID physical block or mark 33A and a data storing area 34 in which an LV resides. Areas 33A–34 occupy one or more tape segments. Similarly, a third partition numbered 2 consists of FID 34 and volume area 35 and is longitudinally adjacent the second partition. Similarly, fourth partition numbered 3 and having areas 37–38 resides next to partition 2. Numeral 39 indicates that additional partitions having LV's are appended to the illustrated partitions up to the LEOV (not shown) of tape 30. Each of the LV's in volume portions 34, 36 and 38 of the illustrated partitions have an EOD indicating end of data in the respective LV's.

In a magnetic tape 30 having fixed size partitions, i.e. all of the multiple partitions have like sizes in terms of numbers of segments in each of the respective partitions. Segments may be used to "find" or "identify" partition boundaries. If the segments have a sufficient resolution, all partitions of fixed sized should have the same data storage capacity. If the segments vary in size with reel rotational positions (see Milligan et al supra), then fixed sized partitions can have differing numbers of segments.

The first partition in a tape in each fixed-partitioned physical volume contains a fixed partition volume header (PH 33). This first partition preferably does not have any system number, i.e. is not accessible by a host processor. Therefore, there is no need for any system control marks, such as tape marks in the PH 33 partition. PH 33 being in its own partition is updatable by the subsystem. Each PH 33, as partially shown in TABLE I above, contains the following information:

a) A Fixed Partition Mark (FPM) that defines (in either a list or a code representing a documented list) the boundaries of all existing partitions. The boundaries are identified by segment boundary numbers. The first segment is numbered segment 1 and has two known PRV's that identify its boundaries. All partitions are similarly indicated. Note that partitions, other than the subsystem managed partition that contains PH 33 do not exist until an LV is created for such partitions.

b) A so-called volume record that contains the volume serial number VOLID of the physical volume.

c) An End of Data (EOD) mark at one end of PH 33. A formatted PVP has the just-described format of one partition (partition 0) and not others. Therefore EOD is at the end of partition 0.

In the library environment, this first or PH 33 partition is created and managed by the library and is used to validate that the correct physical volume has been mounted. This verification ensures both system and data integrity.

In each fixed-partition sized partitioned or LV physical volume, unused data storage space exists between each LV that may contain residual data from prior recordings. Such data are invalid and have to be ignored. In general, it is not possible to read through these unused data storage spaces to reliably differentiate residual (invalid) FID marks from current and valid FID marks without knowledge of the starting and ending segment boundaries. This segment boundary information is stored in PH 33. Once written PH 33 need never be updated since all partitions are defined when the volume is first formatted and before any partition is logically created to make it addressable as an LV. Changes to the partitioning sizes requires rewriting PH 33.

In the variable length partition or variably-sized LV format, multiple partitions of variable length are created after the PVP is initially formatted as a variable partition PVP. Such variable-sized partitioning is such that a continuous formatting from the beginning of the first partition to the end of the last partition is provided. The first or PH 33 partition on the volume contains PH 33 that contains a variable partition volume header having the following information and the information shown in TABLE I:

a) A Variable Partition Mark (FPM) that indicates variable length partitions exist in the PVP.

b) A so-called volume record that contains the volume serial number VOLID of the PVP.

c) An End of Data (EOD) mark.

In the illustrated embodiment, all of the above mentioned marks are in usual or so-called legal data pattern form. Therefore, each of the marks is a physical data block having information bearing signals respectively indicating a tape mark, EOD, etc.

In a library environment, this first or PH 33 partition in a variably-sized PVP is created when the PVP is to receive an LV. The first partition is then managed by the library (as later described) for validating that a correct physical volume has been mounted.

Whenever either a fixed or variably sized partition is created for an LV in any PVP, including the PH 33 partition, the peripheral subsystem always formats the beginning of the next partition by writing the following physical blocks in such longitudinally adjacent unassigned segment (area 39 immediately adjacent to volume area 38) with an additional FID Mark in a next segment (vacant) indicating a partition. An EOD mark is recorded after the additional FID mark if there are no additional recording on the tape further from the beginning of medium or tape.

Again, note that the marks in the illustrated embodiment are each physical data blocks indicating the respective indicated tape status, as end of partition, end of medium, etc.

When a subsequent partition is actually created on the next longitudinal segment(s), the EOD mark (physical block) is overwritten with the VOL1 record (physical block) for identifying the partition being created. The LEOM is written just beyond the hub facing end of the created partition in a next longitudinally adjacent segment (not yet a partition) as part of creating/establishing by formatting segments to be a next partition.

In the variable logical volume format, there is no unused data-storage space between longitudinally adjacent partitions or LV's. Modification of a variable length logical volume (other than the last logical volume on the physical volume) is not permitted. By precluding the creation of residual data between the logical volumes, it is possible to read through all tape segments and reliable detect all FID marks without knowledge of the starting and ending segment boundaries. To improve (decrease) access times to LV's, including the position of a next LV to be created, it is advisable to maintain a directory of the starting and ending segment numbers within the library system.

In either the fixed or variably sized partition tape formats, each FID should be long enough to provide a landing zone which can be accessed under worst case inter-drive positioning tolerances. That is, the longitudinal extent of each FID should be such that fast positioning using the Milligan et al disclosed PRV's will cause the FID to be found in a first locate block operation, as later described. The PEOP point must be longitudinally positioned far enough away from its adjacent BOP point to ensure that PEOP is detected under all interchange conditions. Such spacing ensures against inadvertent overwrite of user or control blocks upon overwriting a next longitudinally adjacent partition begins. Even with the spacing described above, each partition's PEOP point is logically coincident with a next partition's PBOP point. See the vertical double lines between areas 34 and 35 as the PEOP of partition 0 and PBOP of partition 1.

Optionally, each LV may have its own volume table of contents VTOC at the beginning (free end) of a partition. Since each VTOC must be updatable and addressable, then two addressable partitions are required for each LV having a VTOC; one partition for the VTOC and one partition for the LV. In a fixed size PVP, each VTOC portion of an LV consists of one segment while the LV portion partition consists of one or more contiguous segments. The LV VTOC reduces the time needed to determine volume contents. As such, each LV VTOC is a backup to directory data stored in a data base containing this information, i.e. avoids a full scan of the tape to reconstruct the directory information.

Variable length partitions (LV's) need not reside in contiguous segments. This LV fragmentation on the tape requires a VTOC at the beginning of the volume, such as in area 34, for indicating beginnings and ends of each LV fragment. The VTOC in this case would be required to identify the partitions in the event that the data base containing this information was lost i.e. scanning the tape would not provide reliable results for reconstructing the directory information.

FIG. 5 shows partitions and their relationship to segments. In a tape having so-called serpentine tracks, the forward scan direction represented by arrow 311, viz free end toward the hub end, in one set of a plurality of tracks 310 (tracks extending between BOM and EOM) is opposite to the forward direction of scanning indicated by arrow 313, viz from the hub end toward the free end, in a second or adjacent set of a like plurality of tracks 312. Each set of tracks, such as four tracks, 310 and 312 is termed a "half wrap" while the entirety of the two tracks is termed a full wrap. That is, one complete scan in a forward direction beginning at the free end of tracks 310 to the hub end, thence from the hub end of tracks 312 to the free end is one full wrap. The PRV's 315 extend entirely across the tape 30 such that all tracks 310, 312 have a same PRV value in each longitudinal position of tape 30. The space between longitudinally adjacent PRV's constitutes one segment of tape in each set of the tracks. partition's are represented in FIG. 5 by double headed arrows 316,318, 320 and 321.

Optionally, each LV can have a VTOC. Such a VTOC is stored in a one-segment partition immediately preceding the partition holding the LV. Numeral 330 between longitudinally adjacent partition's denote a VTOC partition (one segment) for the respective LV's residing the respective LV containing partitions. Numeral 318 indicates that a partition can extend between track half wraps. The diverse number of tape segments in the LV holding partitions 316–321 indicates that the data storage capacity of each partition is independent of the storage capacity of other partition's - - - it is user defined and implementation dependent. The formatting in each of the LV partitions is as described for FIG. 4. The FID of each LV holding partition can indicate whether or not a VTOC for the LV is recorded in a longitudinally adjacent tape partition. In this manner, in a same PVP some LV's may have VTOC's while other LV's have no VTOC's.

Figure 6:
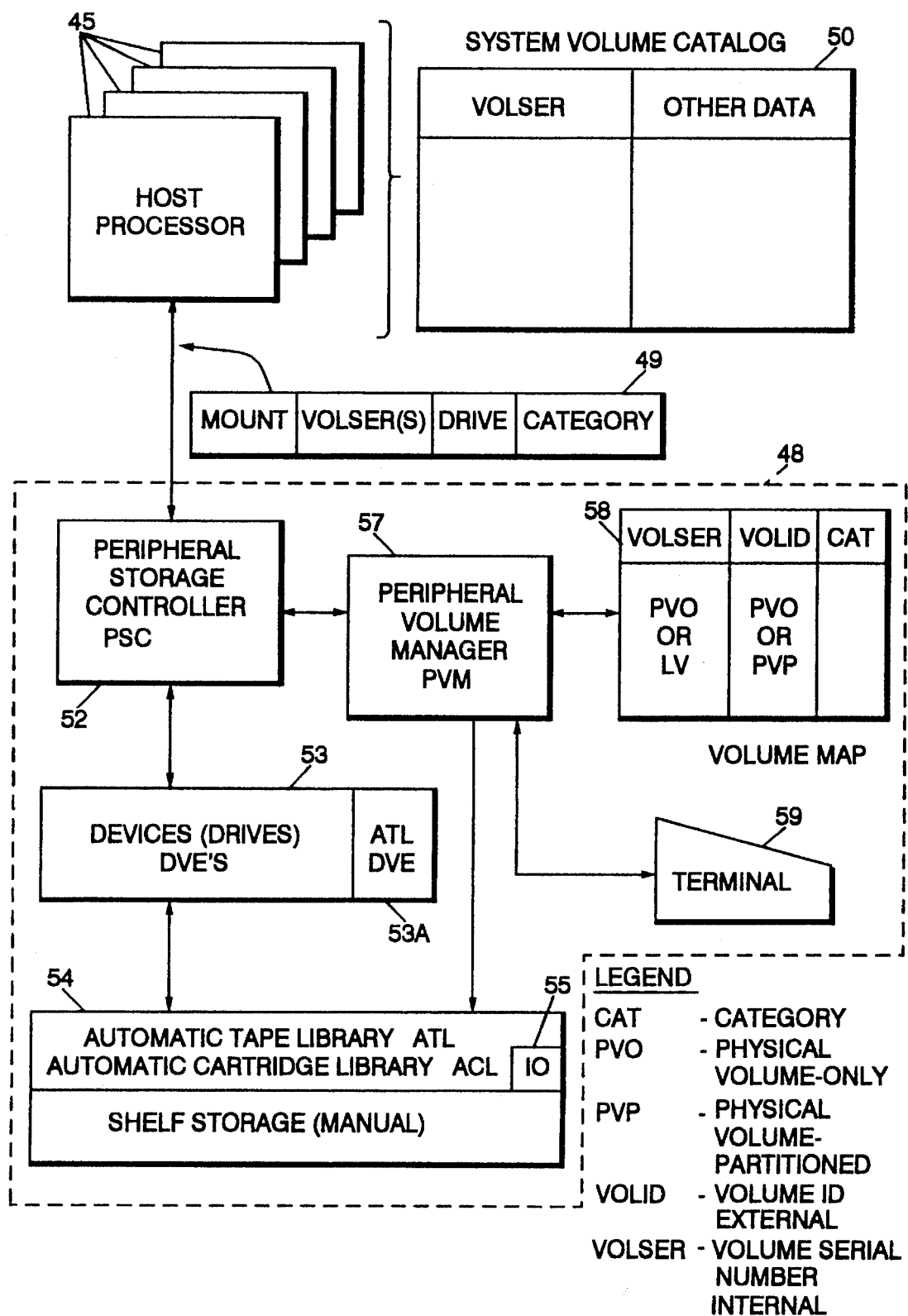
FIG. 6 is a simplified block diagram of a data processing system of the present invention.

Referring next to FIG. 6, one or more host processors 45 are connected to (attach) peripheral data storage subsystem 48 using usual peripheral data channel attaching circuits and cables. A MOUNT command 49 can be sent by any of the host processors 45 to peripheral data storage subsystem 48 requesting mounting of a data storage volume. Such MOUNT command includes the usual MOUNT command indicator, the VOLSER(s) indicated data storage volumes to be mounted, the address(es) of the tape drive(s) to mount the respective data storage volumes, the category in which the VOLSER's are assigned to, any affinity characteristic (later described), the expiration date EXPIRE of each of the data storage volumes to be mounted and a JOB ID that is a host processor reference. In accordance with the present invention, subsystem 48 responds to the MOUNT command to create/establish an LV for each VOLSER identification that does not correspond to any data storage LV established in the subsystem.

As usual, host processors 45 maintain a system volume catalog 50 indexed by VOLSER and having other data relating to the VOLSER (including a table of contents), expiration date, etc. as is known. In practicing the present invention nothing, or a minimal informational content is changed as to maintaining system volume catalog 50. That is, each LV appears as a true addressable data storing volume to the host processors that is mountable in a peripheral data storage subsystem. Of course, data are included in catalog 50 indicating that the volume is a logical or virtual volume.

Peripheral storage controller PSC 52 (also termed control unit, storage director, and the like) attaches the subsystem 48 to host processor 45. PSC 52 includes the usual data flow circuits, error detection and correction circuits, data buffers or caches, device attaching circuits, inter-PSC communication circuits, and the like. A plurality of magnetic tape drives (hereinafter DVE's) are attached to PSC 52 in a usual manner. Physical media storage 54 receives, stores and supplies PVOs and PVPs (storage media such as tape cartridges, tape reels, etc.) from, for and to addressed ones of the DVE's 53. In a preferred form of practicing the present invention, storage 54 includes an automatic tape library of usual design. In this preferred form, a medium cartridge accessor (not shown) fetches PVPs from storage cubicles for automatic insertion into addressed ones of the DVEs. A usual long term manually service shelf storage in proximity to the automatic library(ies) ATL or ACL is provided. The operational relationship of such shelf storage to the libraries will become apparent.

In accordance with the present invention, a peripheral volume manager PVM 57 is added to subsystem 48. PVM 57 provides automatic data storage volume management including automatic creation/establishment of data storage volumes addressable by host processors 45 based upon information contained in system volume catalog 50. Volume map 58 is maintained and stored in a non-volatile RAM or data storage disk(not shown) by PVM 57. Map 58 includes a plurality of entries, each entry including a VOLSER field for identifying data storage volumes, including all LV's. The VOLID of a PVP containing the respective LV is a second field in map 58. Category CAT is a third field. Usage of the information in map 58 will become apparent. A subsystem data base, shown in FIG. 7, is maintained for enabling PVM 57 to perform volume creation and management in the subsystem. Map 58 may be a separate "cached" portion of the data base or be three fields in each data base entry, as will become apparent.

Figure 8:
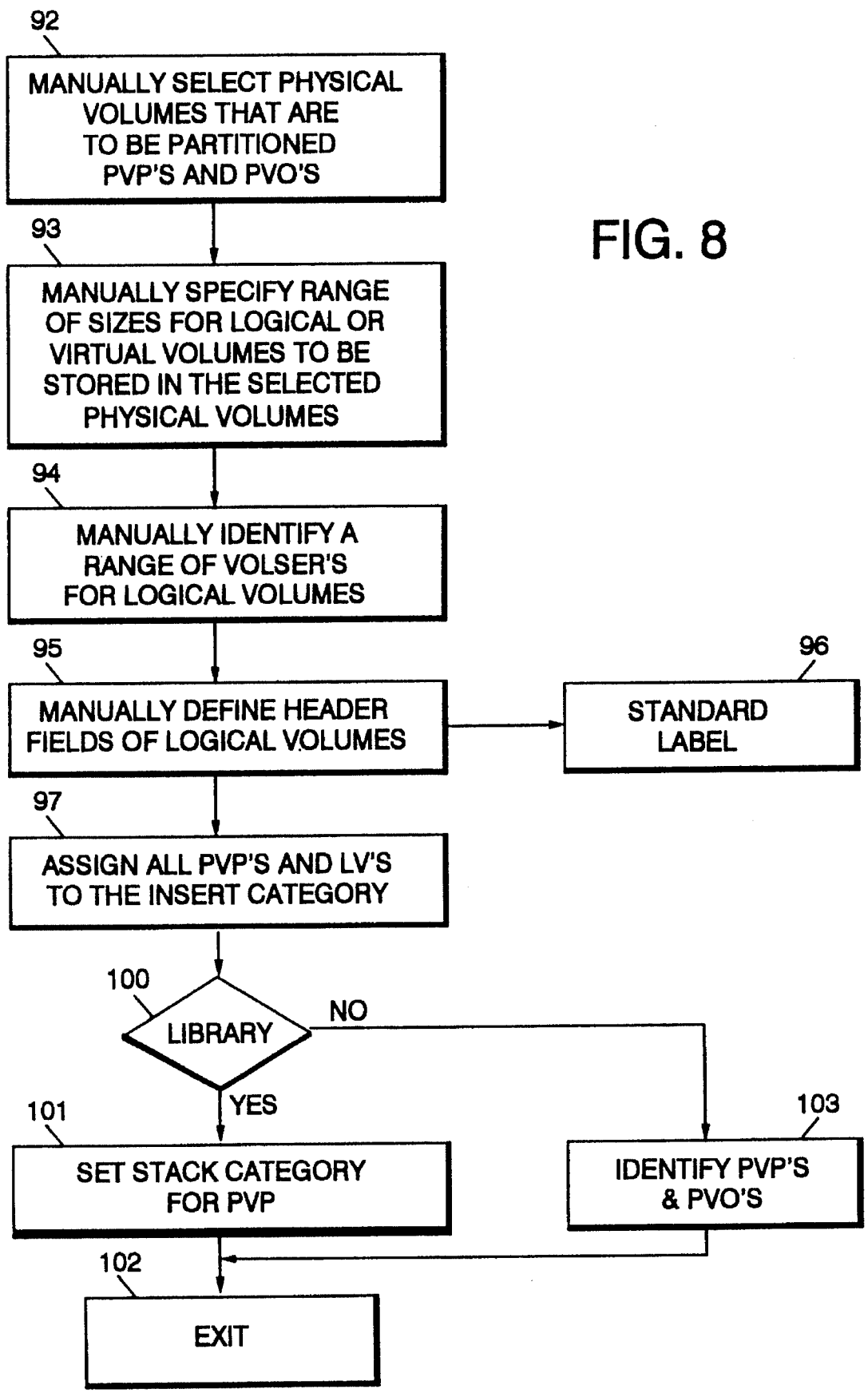
FIG. 8 shows a simplified method for initializing the FIG. 6 illustrated data processing system.

Terminal 59 is connected to PVM 57 for initializing PVM 57 as shown in FIG. 8, later described. As will become apparent, host processor 45 can initialize the subsystem for automatic volume creation as well. PVM 57 may be either a separate electronic control or an executable computer program in PSC 52. As indicated by the arrow extending from PVM 57 to media storage means 54, PVM 57 preferably includes programming that manages media storage means 54 as a library manager. Subsystem 48 may include a plurality of PSC's 52, one of which may contain and execute a program effecting the PVM operations.

FIG. 7 illustrates a data base structure that PVM 57 uses to manage the volumes in subsystem 48. Volume map 58 (FIG. 6) also represents a portion of the subsystem data base. The FIG. 7 illustration diagrammatically shows a data base organization suitable for PVO, PVP and LV's. The illustrated data fields in each data entry are exemplary. The data base includes definitions for all partitioned physical volumes PVP's (including indications of whether fixed-size or variable-size partitions are used), non-partitioned physical volumes PVO's and logical volumes LV's.

The data base is logically divided into two portions, a PVP portion 65 for physical volumes and an LV portion 66 for logical volumes. Three PVP data entries 67, 68 and 69 are illustrative of PVP and PVO entries while the entries 72, 73 and 74 are illustrative of entries for logical volumes. If PVPs and PVOs having diverse data storage capacities reside in the subsystem, then the PVP entries may also contain data storage capacity information (not shown). In each PVP entry, VOLID field identifies the physical volume. If the LV index field is null, then the PVP is empty. If the LV index field contains a special character (not shown) or the VOLID, then the physical volume is a PVO. The data base can be restricted to describing LV's and PVP's, in the latter instance, no PVO's are described in the data base. For a physical volume entry describing a PVP, the LV index has a data base pointer to a linked list of VOLSER or LV entries in the LV portion 66 for all LV's residing in the described PVP. The available data storage space of an LV occupied PVP can be calculated by reading the linked list of portion 66 for accessing the start and ending PRV for each LV.

In each PVP entry of portion 65, a category field indicates any category the physical volume is assigned to. A date/time field indicates the date and time of entry of the PVP into the managed subsystem. The mount request field indicates whether or not there is an outstanding request to mount the physical volume. For a PVO, the mount request is for the physical volume while for a PVP the mount request is for an LV residing in the PVP. The mount request for each LV to be mounted is also indicated in portion 66 entry. Mounted field indicates whether or not the PVP or PVO is mounted on a tape drive and the subsystem address of such tape drive. A null mounted field can be used to indicate that the PVP or PVO is not mounted. If the PVP or PVO has an assigned affinity characteristic, the affinity field indicates that characteristic. The type field indicates whether the PVP is a fixed sized partitioned or a variable sized partition physical volume. The library field "lib" indicates the address at which the physical volume is stored in an automatic library. History field may be used to indicate a recent history of the physical volume, such as mount history, LV additions/deletions, error conditions and the like. Last use field indicates the last time the physical volume was mounted on any tape drive. Such last use can be used in connection with volume replacement or ejection algorithms beyond the scope of this description. Job ID field may indicate the host processor Job ID associated with the last use. In many instances, the Job ID is not made available to the subsystem such that the field may be dispensed with or may be nulled. Other fields may be added to the PVP/PVO entries, as desired.

Portion 66 has a large plurality of LV entries represented by the three entries 72–74. The VOLSER field identifies the LV. VOLID field identifies the PVP in which the LV resides. If VOLID is null or empty, then either the LV has not been created (the VOLSER is available for assignment to an LV to be created) or that an LV has been "scratched". The term scratched merely means that the VOLSER does not identify any LV, i.e. the VOLSER is disassociated from any PVP. The start PRV and stop PRV fields identify the limits of the VOLSER identified LV (more correctly, identifies the limits of the partition in which the LV resides). The number of segments in a partition holding the LV is an indication of the LV data storage capacity. Note that segments have different data storage capacities such that the segment numbers are used in calculating capacity for an LV. The number of the partition having the LV is indicated in field "partition no." For example, host processor accessible partitions are numbered in each PVP from 0 to N, where N is a positive integer indicating the highest numbered existing partition. The PH 33 partition is not accessible by a host processor. The CAT field contains the category code(s) appertaining to the identified LV. Such categories may be the same as the categories for the host PVP, no limitation thereto is intended. The LV categories can be independent of the PVP categories. This latter arrangement enables assigning a first category to an LV, such as "private division 1 accounting", a category showing expiration on Dec. 31, 1994 for the LV and a second category to the PVP holding the LV such as expires on Jun. 15, 1999. The cited categories are only exemplary. The MOUNT and MOUNT REQ fields respectively indicate the status of the LV as mounted or requested to be mounted. Since each PVP may hold a plurality of LV's, only one of the LV's may have a mounted status. A history field indicates the recent mount history and other usage of the LV. The history field may include the information in the Job ID and Date/Time fields. Such host related information may not be used by the subsystem enabling the entries to be dispensed with. The pointers field are the data base pointers creating the linked list. Such linking may be either singly or doubly linked.

The MOUNT message 49 that actuated subsystem 48 to select a PVP, then format one or more segments of the selected PVP to create a partition for receiving the field 65 identified LV may include indications of category, affinity, expiration date and the like for an LV identified by a VOLSER in the MOUNT message. MOUNT message may also indicate any MOUNT from Category command Job/Step ID that caused a PVP to be initialized so as to be addressable by a host processor. In a preferred form of the invention, only PVP's are so initiated, no limitation thereto intended.

FIG. 8 illustrates interactive steps used to initialize subsystem 48, particularly PVM 57, for automatically creating addressable data storage volumes from stack or scratch volumes that are not yet addressable by host processors 45. The interactively entered VOLSERs and VOLIDs can indicate categories or affinities. Such VOLSERs and VOLIDs may be used in the Gelb et al, supra, automatic class selection procedures. Interactive step 92 identifies to subsystem 45 via terminal 59 the PVPs that are not initialized and are to become partitioned PVPs for storing LVs. Each PVO is but a single tape volume and is one addressable volume. Each PVP is initialized as later described.

Figure 9:
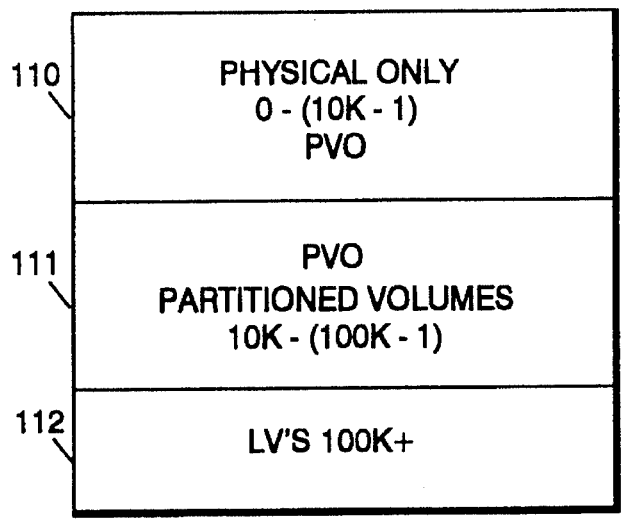
FIG. 9 diagrammatically shows an exemplary volume serial number (VOLSER) range of values for use in the FIG. 6 illustrated data processing system.

As seen in FIG. 9, a range 110 of VOLIDs for PVOs is from zero (0) to (10 K−1). These PVOs can contain valid user data and are not available for reuse nor are to be converted to stack PVPs (erased in their entirety). In a practical embodiment, such range of values may be VOLIDs starting at a predetermined value. In a library system of media storage means 54, after the subsystem is initialized such identified stack PVP's and scratch PVOs are introduced into the storage means 54 by an IO station 55 (FIG. 6) in a usual manner. That is, the VOLID to be used in subsystem 45 for each introduced PVP or PVO is placed on the outside of the tape cartridge/reel for human/bar code reading.

Figure 11:
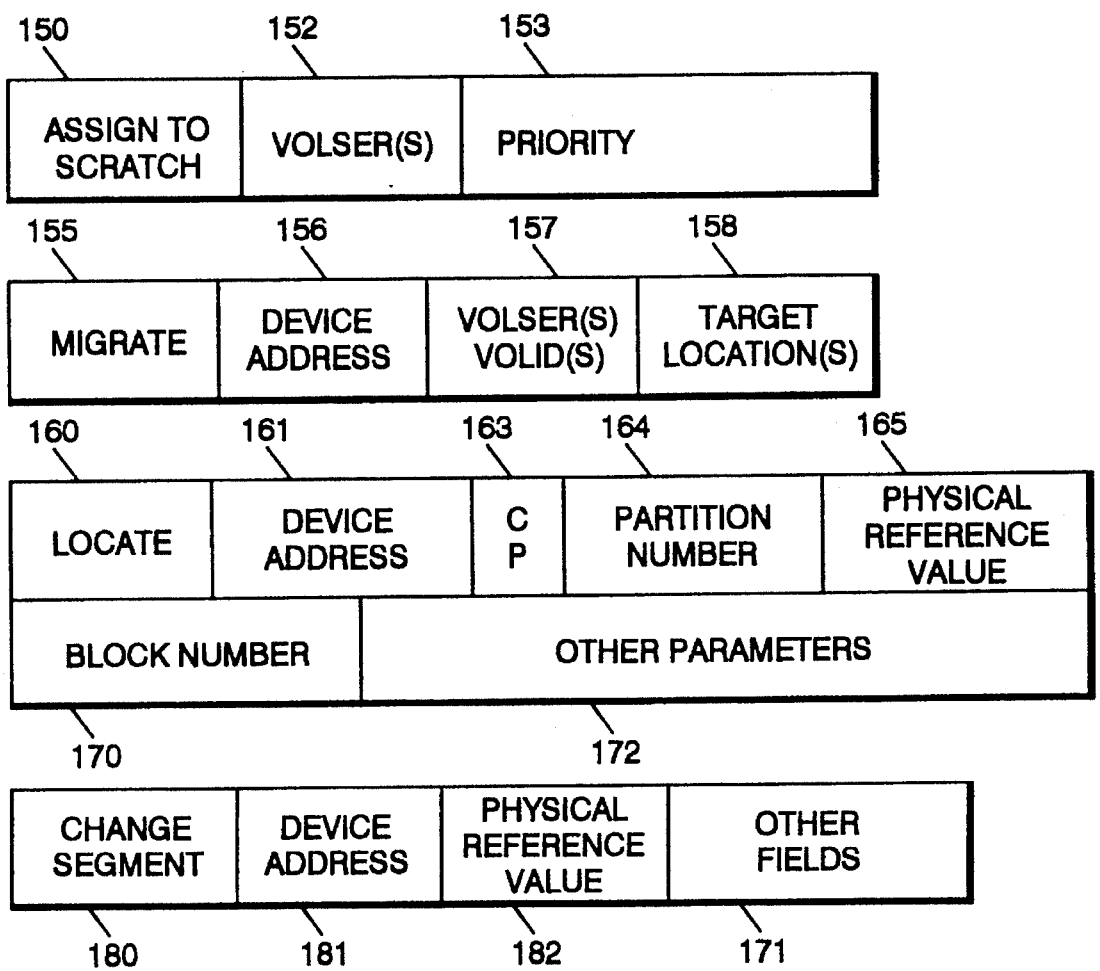
FIG. 11 diagrammatically illustrates an exemplary set of peripheral or channel commands for use in the FIG. 6 illustrated data processing system.

While terminal 59 is useful for initializing subsystem 48 to automatically create logical volumes, the operator terminal connected to PVM 57 may be dispensed with if such initialization is handled via a host processor. The subsystem initialization function is then managed by host processor software using the stack category and a create logical volume function as shown in FIG. 8 but commanded by a host processor rather than using terminal 59 (FIG. 6). In the host processor commanded subsystem initialization, a host processor terminal or system management program (not shown) receives manual input for enabling initiation of subsystem initialization. Host processor 45 sends a subsystem initialization command (not shown but constructed such as shown in FIG. 11 for other commands) that indicates the ranges of VOLSER's for the logical volumes, the ranges of VOLID's for non-partitioned or physical only physical volumes PVOs have a default range of values. To assist in the automatic management of the subsystem 48, so-called buffered log data (a known collection of status information in IBM peripheral data storage subsystems) of subsystem 48 is modified to allow the inclusion of a VOLID in the data. This inclusion enables the VOLID of the PVPs, that are not separately addressable by a host processor because the VOLID's are not known to such host processors) to be given to the host processors for inclusion in performance and error statistics associated with the PVPs. Additionally, it allows subsystem 48 to present physical volume performance and error statistics to any host processor statistics for any volume, physical or logical, in an unsolicited manner, including statistics generated as the results of subsystem copying of logical volumes for moving such logical volumes to a different PVP.

Interactive step 94 identifies to subsystem 45 range 111 of PVPs as being from 10K to (100K−1). When introduced into the media storage means 54, such PVPs contain no data before nor after the below-described initialization. A MOUNT command for mounting an LV must be received before any PVP can store data. The actual VOLIDs have unique identification such as starting with any selected information pattern. Each unformatted PVP that becomes a PVP has no change in VOLID. Similarly, interactive step 95 identifies to subsystem 45 range 112 of VOLSERs to be used for identifying LVs as being 100K and above. Each actual VOLSER or VOLID may have an alphanumeric content.

Interactive step 95 defines to subsystem 45 a so-called IBM standard label (VOL1, HDR1, etc.) for created and initialized LVs but not storing any data on PVPs or LVs. PVM 57 receives the information for storing same in register 96 as "standard label". The stored label information is inserted into each newly created LV immediate adjacent its FID. Interactive step 97 completes the initialization by assigning all identified PVP VOLIDs. Also, the LV VOLSERs are supplied to host processors 45 for insertion into system volume catalog 50 as host processor available data storage volume identifications. Subsystem 48 assigns the new LVs to an "insert" category. Subsystem 48 then passes the VOLSERs of the LVs in the insert category to the host processors 45 as if such volumes have been actually introduced into the subsystem. The host processors 45 respond to the received LV VOLSERS to add the new VOLSERs to the system volume catalog 50 even though no such volumes actually exist. The VOLSERs in range 112 are indicated as having some given data storage capacity (any capacity for each VOLSER).

Figure 10:
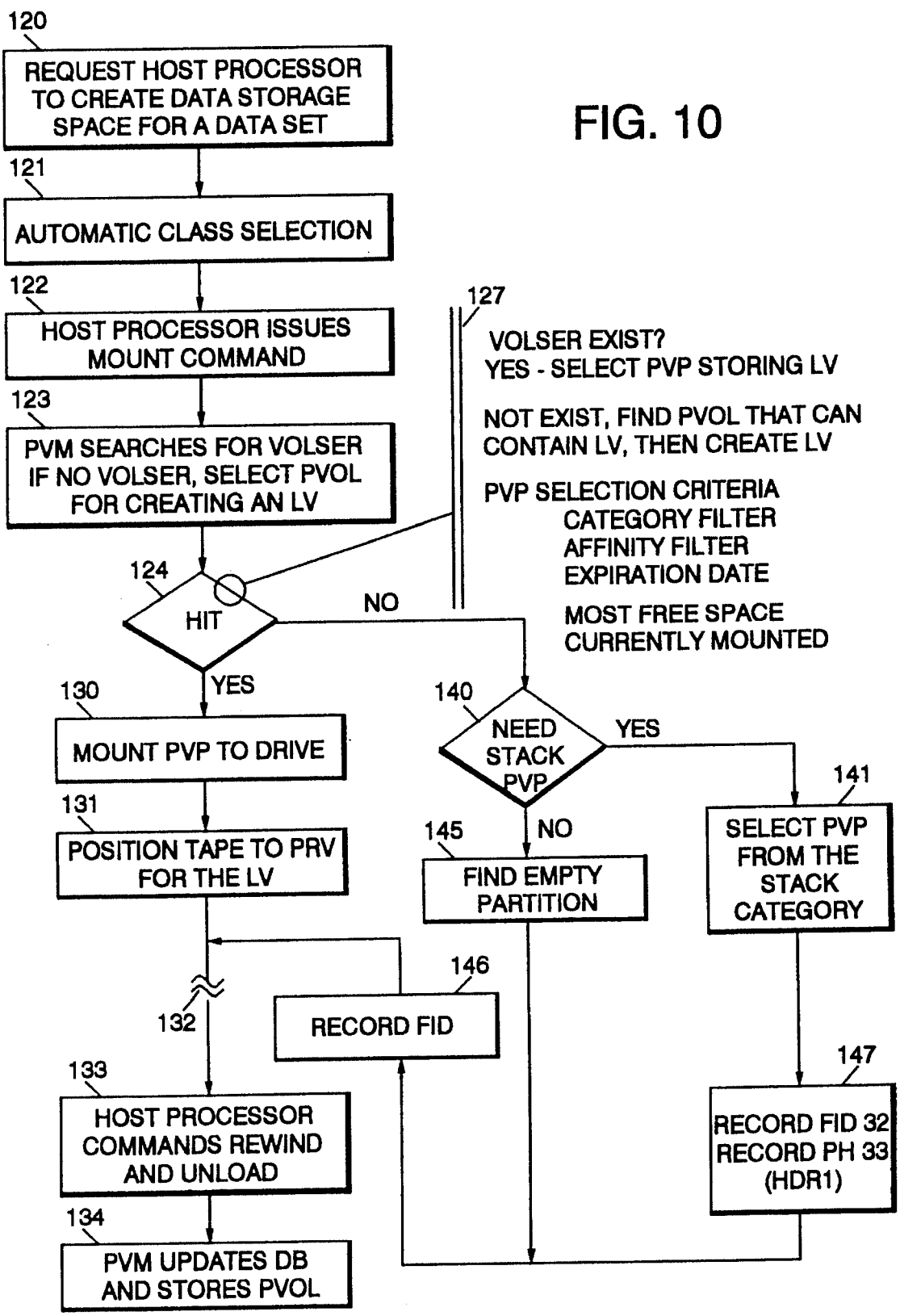
FIG. 10 shows a simplified method for automatically creating or establishing a logical volume LV in a FIG. 6 illustrated and initialized data processing system.

FIG. 10 initialization of an LV on a selected PVP can occur after the FIG. 8 illustrated subsystem initialization has been completed. In FIG. 10, interactive step 120, via a terminal (not shown) attached to a host processor 45 or by execution of an application program in host processor 45, requests host processor 45 to create data storage space for a data set (request allocation). This request preferably includes a data set name DSN that is functionally selected to implicitly indicate character of storage and may include category and affinity parameters. Machine step 121 receives the DSN and is parameter data for automatically selecting the Gelb et al, supra, defined classes for facilitating selection of an LV. The Gelb et al class selection selects a VOLSER from the LV VOLSERs in range 112 that were inserted into system volume catalog 50, capacity parameters and the like or selects a category containing scratch volumes having desired attributes. Host processor 45 then issues a MOUNT command 49 to subsystem 48 whether or not an LV having the desired VOLSER has been created for the host processor.

Subsystem 48 receives MOUNT command 49. PSC 52 decodes the received MOUNT command, then requests PVM 57 to identify which PVP is to be mounted on the DVE indicated in the MOUNT command. Then in step 123 PVM 57 searches the FIG. 7 illustrated data base for the VOLSER entry for the MOUNT command-identified VOLSER(s) for mounting a PVP on the addressed DVE. Numeral 127 indicates exemplary results and search criteria for determining a "hit" (VOLSER exists because a data base entry for the command-identified VOLSER exists and has a PVP identified in field 68) in step 124, i.e. identify a PVP that either contains the requested VOLSER LV or has a scratched partition (an LV was moved from the "scratched" partition or the LV was scratched (made reusable) leaving the partition empty and unaddressable by a host processor). If the VOLSER has no associated PVP (the VOLSER data base entry 72–74 has its VOLID field empty), a miss or NO exit of step 124) at step 124 if used. Then PVM 57 identifies a PVP on which the VOLSER identified LV may be created.

If PVM 57 determined at step 124 that the requested VOLSER identifies a LV, then the PVP containing the requested LV is identified by reading field VOLID of a data base entry 72–74. The library reel storage compartment is identified by reading field LIB of the host PVP entry 67–69. If the identified PVP is not mounted on the addressed DVE (field MOUNT in an entry 67–69 indicates VOLSER is not mounted on any DVE 53), then at step 130 the PVP is moved from the media storage means 54 indicated location of field LIB to the addressed DVE for mounting. If the selected PVP is mounted on a DVE other than the addressed DVE (indicated in field MOUNT) and the PVP is not in use (e.g. an LV is not currently mounted on that tape drive), then either the PVP is moved to the addressed DVE or the other DVE is temporarily assigned the addressed DVE address for accessing the selected PVP. In any event, at step 131 tape 30 is positioned in the DVE to the field 85 indicated starting PRV at which the addressed LV begins, i.e. at PBOP (FIG. 5). After mounting the selected PVP, usual data processing activities ensue, all as indicated by numeral 132.

When the requesting host processor 45 determines that the data processing has been completed, then at step 133 the requesting host processor commands the subsystem to unload (demount) the mounted LV. A PVP with unused or available established partitions or unassigned segments typically stays mounted in a tape drive for receiving a newly established LV, i.e. a volume miss has occurred because an mount command identified VOLSER has no corresponding established LV.

If at step 124, PVM 57 determines that no LV exists for the VOLSER, then PVM 57 will automatically establish an LV(FIG. 10) having the requested VOLSER. A category or affinity value can be used to implicitly indicate desired LV data storage capacity. In preparing for LV establishing an LV at step 140, PVM 57 determines, using category and affinity parameters in MOUNT command 49 (FIG. 6), if a PVP exists with LV's, preferably mounted on a tape device that can receive the requested LV (if none are identified, then a PVP in the stack category is selected. The FIG. 7 illustrated data base is searched in the category field CAT for finding VOLIDs that can be used for storing the received VOLSER indicated LV. If such a PVP is found (preferably a mounted PVP), then the available data storage space is checked (not shown). Such checking includes summing the number of segments for the data base LV's (VOLSERs) existing in the identified VOLID field of entry 68, then comparing the sum with either a default value (all PVPs have identical data storage capacities) or the data storage capacity indicated in VOLID field of entry 68 as set forth above). An alternate method of summing is to subtract the starting PRV entry 68 value from the ending PRV entry 69 value to ascertain the number of tape segments occupied by the existing LVs in the PVP being examined. On the other hand, the PVP may have only fixed-sized partitions. In that case, there either is or is not an unassociated partition for receiving the LV. In any event, the number of unallocated segments of the PVP is determined. Any PVP mounted on the selected tape drive is always considered first. Such selection is a fastest procedure for establishing an LV in a PVP as it eliminates mounting a PVP into a tape drive for satisfying the MOUNT command. If several PVPs entries are examined, then the candidate PVP having a largest number of unallocated segments is selected. If the affinity parameter indicates that it is desired to disperse LVs having such affinity parameter, i.e. provide simultaneous access to LVs with a minimal access request conflicts to a single PVP, then a PVP having no LVs or a predetermined minimal number of LVs with such affinity parameter is selected. On the other hand, if an affinity parameter indicates that it is desired to cluster LVs in a few PVPs (sequential processing), then a PVP having adequate number of unallocated segments plus a number of LVs having the same affinity cluster parameter is selected for receiving the LV to be created. Therefore, the affinity parameter can effect assigning LVs to PVPs by indicating a desired LV pattern of distribution amongst plural PVPs.

The selected PVP, if not already mounted, is mounted on the addressed DVE. Then at step 145, PVM 57 selects an available partition (no LV is assigned to an available partition, i.e. it is logically empty) having a proper number of segments. The empty partition is formatted to receive the LV. The LV to be established, including creating a partition as described later, is allocated to unallocated segments. Remember, that each partition in each PVP is a contiguous set of segments with no unallocated segments residing within a partition.

At step 146 PVM 57 actuates PSC 52 to record the LV's FID in the first allocated segment for identifying the created partition as the LV having the MOUNT command-identified VOLSER and PH 33 is updated to reflect the new partition. PVM 57 also writes into the created partition an IBM standard label from register 96 as if the created LV were in fact a PVO physical volume. The FIG. 7 illustrated data base is then updated by updating the entry for the newly established LV to reflect the LV's association with a PVP (enters the VOLID of the PVP into the VOLID field of the entry 72–74 of the LV's VOLSER). PVM 57, via PSC 52, reposition tape 30 to the PBOP of the partition receiving the new LV. Then PVM 57, via PSC 52, indicates to the requesting host processor that the command-identified VOLSER is mounted and data processing may ensue as indicated by numeral 132. If a new partition is established in the PVP, then PVM 57 also updates PH 33 to include the newly created partition.

If a stack PVP is needed at step 140, then PVM 57 selects any stack PVP for receiving the LV to be established. Then at step 147, a PH 33 partition is created and PH 33 is recorded in the PH 33 partition. Then steps 146 et seq are performed.

FIG. 11 illustrates, in simplified form, selected peripheral commands issued by a host processor 45 to subsystem 48. Other commands, not shown, are also issued. All of these commands employ the general arrangement shown for MOUNT command 49 and the FIG. 11 illustrated commands. PSC 52 receives and decodes each of the commands, as well as other commands not pertinent to an understanding of this invention and therefore not mentioned herein. MOUNT command 49 (FIG. 6) is not repeated here. Such MOUNT command represents diverse types of commands that may be used for accessing PVOs or LVs, design choices that my be employed in practicing the present invention.

An "assign to scratch" host processor issued peripheral command indicates that an identified LV(s) are to be disassociated from its PVP. The disassociation is achieved by removing the addressability of the LV by deleting the PVP identification in field VOLID from the LV's data base entry 72. The "assign to scratch" command has command-indicator field 150, VOLSER(s) command modifying parameter field 152 (addressed LVs) and an optional priority of execution field 153. Field 153 indicates an order of execution of this command with respect to other host processor issued peripheral commands. This command can be considered as a command to change the category of the LV. Execution of this command does not require mounting the addressed LV onto a tape drive. The entire command is executed by the above-described deletion to the LV portion 66 of the peripheral data base. PVM 57 updates the linked list of LV's for the affected PVP to reflect deletion of the LV. The LV pointers field is erased with the pointers fields in logically adjacent LV entries of the PVP linked list are changed to reflect removal or disassociation of the addressed LV from the PVP. Optionally, data security may require that the data content of the disassociated LV be erased. In that event, subsystem 48 mounts the addressed LV on the subsystem tape drive 53A for erasing the addressed LV's data content.

A "migrate volume" command has command identifier field 155, device address field 156, VOLSER(s) command modifying parameters field 157 (address LVs or PVPs) to identify the volumes to be migrated and target location(s) field 158. Field 158 may indicate a migration of a physical volume or a logical volume to shelf storage, from shelf storage to a library, to a different volume category, and the like. The migrate volume command is typically initiated by a host processor operator via a host processor 45, via terminal 59 or by a volume management program (not shown nor described) executed in a host processor 45 that is beyond the present description. The subsystem procedures for effecting volume migrations is later described with respect to FIG. 13.

A "locate" or "locate block" command for finding any block within any of the LV's stored in a PVP is shown. Prior art locate commands did not have to accommodate more than one addressable volume in one reel of tape. Each LV in a reel of tape has its own set of block numbers that start at zero (0) and proceed to some positive integral value. Further, as will become apparent, the LV's being portable between any two PVPs and between PVPs and PVOs will reside at diverse longitudinal positions of the different magnetic tapes. For using a high speed search, the segment size has to be considered for executing the locate command. That is, the longitudinal extent on tape of segments at the hub end of the tape are shorter than the longitudinal extent on tape of segments at the free or leader end. For accurate positioning, such segment lengths have to be known irrespective where the LV was first recorded and is current recorded upon receipt of a locate command. Each of the PRV's is a "fixed" position of tape 30, i.e. fixed with respect to BOP of the tape. It is also preferred that each tape drive can locate any partition without using PRV's. In any event, after executing a locate command, a target logical block must be found before writing into a partition supposedly storing the target or addressed logical block.

In the locate command, field 160 contains the command indicator. Field 161 contains the device address. CP field 163 is always set to zero (0) in a locate command that is accessing any LV. In the prior art, partitions were not associated with separately-addressable host-processor logical volumes. An example is PVO segments can be each a prior art partition or can be grouped into respective prior art partitions. Remember that each PVO (prior art) consists one and only one addressable data storage volume.

Field 165 contains the PRV or segment number value that is known to the host processor 45. The generation of this value is describer later with respect to execution of a locate command as shown in FIG. 13. This value may not be a correct value for the LV being addressed, therefore PVM 57 adjusts the command contained value to provide an accurate execution of the received locate command. That is, host processors 45 believe that each LV is mounted on a different tape reel and that all segment numbers are not from PBOP (as in the case of each LV physical block) but are from BOT. Therefore, the displacement in segment numbers from BOT to PBOP of the LV being addressed is added to the segment number contained in the locate command. When PRV's are linear, then simple addition is usable for identifying the partitions. When PRV's are not linear, then a function:

$PRV_L$=f(partition number, $PRV_P$), where $PRV_L$ is the PRV used in the locate/read block ID command and $PRV_F$ is the current actual PRV on the tape in the PVP. The values of the equation set forth above are empirically determined from each tape format, therefore are not described herein. Block number field 170 contains the block number assigned to the logical block within the VOLSER identified LV in the MOUNT command 49 that preceded host processor 45 issuing the locate command.

Figure 12:
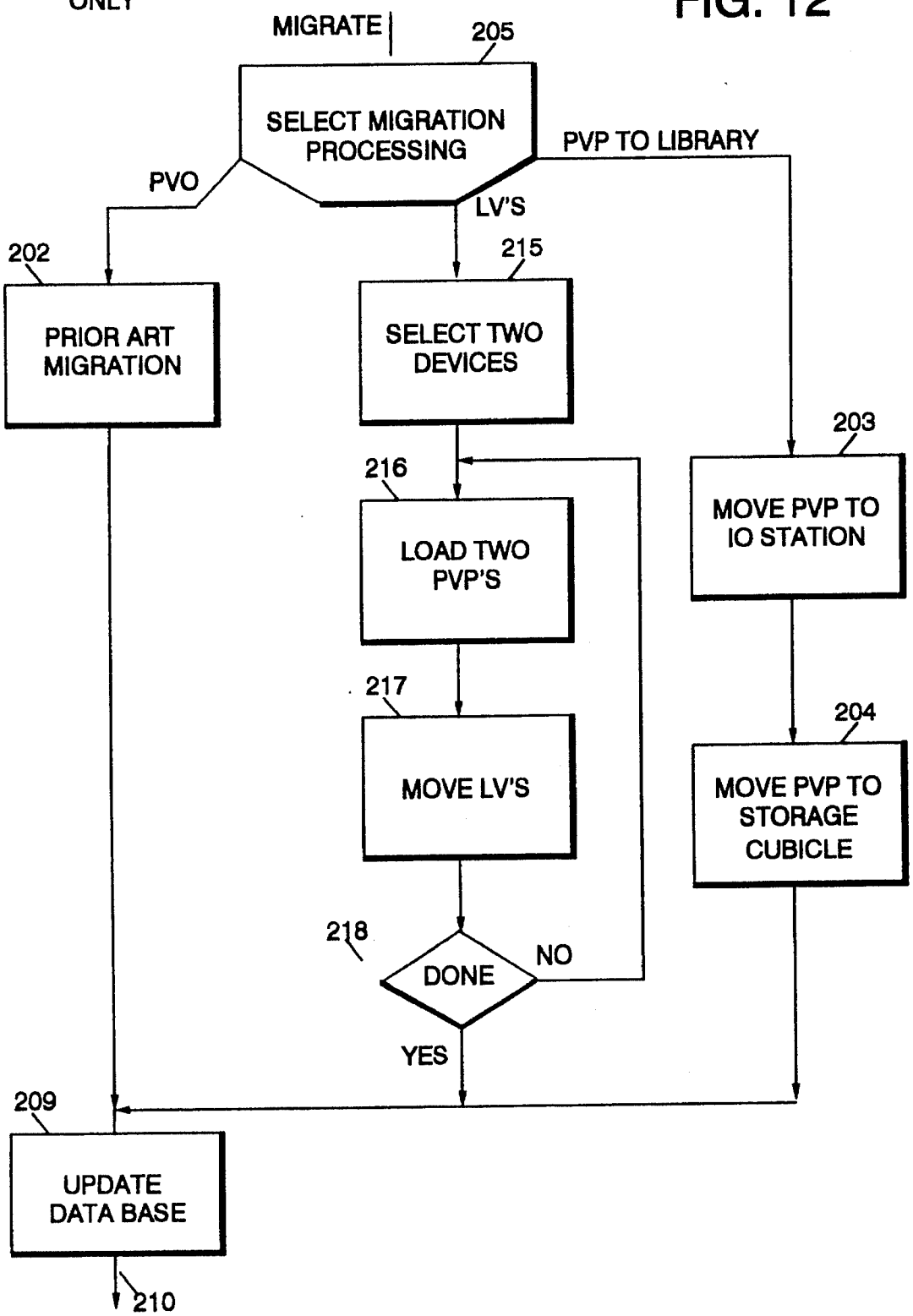
FIG. 12 illustrates in simplified form exemplary machine operations of the FIG. 6 illustrated data processing system for migrating physical and logical volumes between diverse data storage apparatus.

Referring next to FIG. 12, migration of LV's, PVOs and PVPs within media storage means 54 and the like is explained. One or more migrate commands may be used in connection with host processors 45. This description is based on one host processor issued migrate command for all types of volumes, it is to be understood that each separate migration process may be achieved by responding to respective separate host processor issued migrate commands (not shown).

In an early constructed embodiment, the PVOs were the only ejectable (migrate out of the media means 54) while PVPs were not ejectable (must always remain in media means 54). One reason for such physical volume ejection control is that host processors 45 could address the PVOs while not being able to address the PVPs. Only LVs residing in a PVP can be host processor addressed. Any volume that is addressable by a host processor is included in system volume catalog 50 whereas the PVPs do not show up in system volume catalog 50. For maintenance purposes, peripheral storage controller 52 creates a so-called buffered log (known in the prior art). Any error conditions detected in subsystem 48 related to a PVP are included in the buffered log. However, such inclusion in a buffered log does not made the PVP addressable by a host processor.

It is noted that media means 54 preferably includes an automatic tape library ATL plus shelf storage. The shelf storage is usually not managed by PVM 57, therefore the PVPs cannot be migrated to shelf storage. Further, the LVs when migrated to shelf storage are first moved from a PVP to a PVO for the migration. It is within the scope of this invention to include a shelf storage that is managed by PVM 57, as via terminal 59. In this instance, PVPs may be moved (migrated from ATL to shelf) to such subsystem managed shelf storage. FIG. 12 includes reference to such PVP migration for illustrative purposes.

A migrate command is received by PSC 52. PSC 52 in decoding the migrate command actuates PVM 57 to execute the command. PVM 57 first determines at step 205 whether the migration is for a PVO or an LV. If the command is for an LV migration, then PVM 57 whether or not a plurality of LVs are to be migrated is checked. Also, whether the plural LV migration includes a separate migration of one or more LVs independently of which PVP currently is storing the LV is checked. To migrate a PVO, any known or prior art migration is used in step 202. Such migration of a PVO can be from shelf storage into ATL of means 54, from ATL to shelf storage, exit from the data processing installation or entry into the data processing installation. Upon completing migration of the PVO, PVM 57 updates the FIG. 7 illustrated data base to reflect the migration, reports completion of the migration to the commanding host processor and exits migration over path 210. The PVO migration is effected by PVM 57 commanding media storage means 54 to move a PVO to or from IO station 55. Manual access to IO station 55 moves the PVO to and from shelf storage or to another data processing installation.

Migrating LV's involve new and different procedures. As stated above, PVP's are not addressable by a host processor therefore cannot be commanded to be migrated. Also, since LV VOLSERs cannot be transferred from PVM 57 control of an ATL, there is no migration of PVP's in the illustrated embodiment to shelf storage. Migration of LV's to shelf storage includes moving the addressed LV from a PVP to a PVO, an ejectable physical volume, then migrating the PVO to shelf storage.

However, assuming that a shelf storage stores physical volumes PVO and PVP having a range of serial numbers for the automatic library ATL, migrating a PVP to a library from shelf storage within means 54 involves, at step 203, PVM 57 sending a message to the shelf storage area (such as via terminal 59) to manually fetch the PVP and load it into IO station 55. PVM 57, then commands the library at step to fetch the PVP in the IO station and store it in a designated storage cubicle. The FIG. 7 illustrated data base is updated in step 209 to reflect the PVP migration. Such updating is a deletion of the data content of VOLID field of the LV entry 72. During the LV migration, the VOLSER identifying the LV is disassociated from any PVP, therefore is available to identify another LV. The volume of data is identified by the VOLID of the PVO carrying the volume of data to shelf storage. Host processors 45 update system volume catalog 50 to reflect the change of the volume of data from the VOLSER of the migrated LV to the VOLID of the migrated PVO.

If shelf storage can store PVPs under subsystem 48 control, then a PVP to shelf migration (not shown) can be effected. The migrate command identifies one or more LVs to be to migrated. The PVP is never addressed by the migrate command, PVM 57 selects the PVP to be migrated based upon identified LVs to be migrated.

For migrating an LV, the FIG. 11 illustrated migrate command requires two device addresses in field 156. As an alternate to two device addresses, an ATL DVE 53A dedicated to use with intra-library ATL copying is provided. Only PVM 57 can command PSC 52 to select and use the ATL DVE dedicated device. In an alternate arrangement, the device address in the migrate command is the source PVP while the ATL DVE always mounts the PVP to receive an LV from the command addressed DVE. A second alternate is to enable PVM 57 to select one of the host processor devices, via PSC 52, as a target device. Such PVP mounting in a DVE is represented in the drawing by step 216. Such PVP mounting includes adding the LV to be moved to the target or LV-receiving PVP. At step 217, the data are moved from the PVP in the addressed DVE to the target PVP. Since multiple LV's may be moved, PVM at step 218 checks for completion of the consolidation of multiple LVs into one PVP. For multiple LV's being moved, the PVP mounting step 215 is repeated to ensure correct PVP's are mounted in the addressed and target DVEs. Remember, that such PVP migration only occurs if the shelf and library are tightly coupled in control.

One LV can be migrated to shelf at a time. In the preferred embodiment, the LV receives the VOLID of a PVO during the migration. The original VOLSER becomes disassociated from any PVP. Selecting two DVEs to migrate one LV can be a two step process executed as step 215 for addressing two DVEs. A host processor 45 issues a migrate command, including a first device address, for an LV that is used for migrating a PVO. PSC 52 responds to the host processor command that the migration cannot be effected because the volume (LV) to be migrated is on a shared tape. Host processor 45 responds to the message to identify a specific scratch PVO or any PVO of a scratch category in a mount from category command as a target PVO for the LV with a second device address to mount the target PVO. This action selects two DVEs and identifies a PVP (via PVM 57 searching the FIG. 7 illustrated data base) having the LV to be migrated and a PVO to receive the LV. At step 216 the identified PVP and PVO are mounted to the respective addressed DVEs. Step 217 copies the LV from the mounted PVP to the mounted PVO. Then the mounted PVO is ejected from the library via IO station 55. The mounted PVP may remain mounted until its addressed DVE is needed for another tape. Step 218 is skipped. Step 209 updates the data base by selecting the LV entry (VOLSER) for deleting the VOLID entry and adjusting the pointers to shorted the linked list of the source PVP. The subsystem 48 (machine operations are initiated and controlled by PSC 52 and PVM 57) then proceeds to other activities via exit 210. Remember that the PRV's of the LV are maintained to be correct on the migrating PVO. The VOLSER of the migrated LV is made available, i.e. disassociated with the source PVP. The data volume in the PVO assumes the VOLID of the receiving PVO. Subsystem 48 reports the changes to the requesting host processor for updating system volume catalog 50.

Referring next to FIG. 13, the execution of a locate command is described. As background, a known Read Block ID command can be used to request the current position on the medium as defined by segment number and logical block number. A known Locate Block command can be used to position to a specified location on the medium as defined by segment number and logical block number. On executing locate commands, the segment number is used as a point of locality to start scanning while reading data recorded on the tape for finding the specified logical block.

It is common practice to use of a Read Block ID command before writing data into a tape volume, such as a PVO. A similar procedure is used to write data into a LV. This procedure is next described. The Read Block ID command execution provides location data for finding data to be next written into an LV or PVO. The Read Block ID command is used to find and identify the actual location of a logical block after which additional logical blocks are to be recorded. The identified existing logical block is a target to which a high speed search can be terminated for quickly positioning the tape for reading or writing appended logical blocks. Such Read Block ID command will cause the longitudinal location on tape to be precisely located as to a PRV, then finding the desired logical position within an LV. This location information is given to the host processor 45 for storage. Host processor 45 later may have the LV mounted on an addressed DVE. Host processor 45 then issues the later described Locate Block ID command for positioning the tape to the location indicated by the Read Block ID executed command. If the LV is copied to another PVP before the mount, then such LV is usually recorded at a different longitudinal position on the another PVP. Such change invalidates the Read Block ID generated location information. Since it is desired to insulate the host processor from the effects of such LV location changes, the execution of the Locate Block ID command will accommodate the location changes. Remember that the host processor 45 is treating the LV as a real data storage volume.

Returning now to the Read Block ID command execution, at step 225 the host processor 45 issues the Read Block ID command as a preparatory action for recording data in the data volume, whether an LV or PVO. Subsystem 48 executes the Read Block ID command to develop and collect location information. Then, in step 226 subsystem 48 (PSC 52 effects command execution and reporting in a usual manner) sends the developed location information, as listed above, to the host processor 45. In step 227, host processor stores the Read Block ID provided location information for later quickly accessing the data to be next written into the data storage volume. After recording the appended data, many other operations will occur, some of which may cause the LV to be moved from its last-accessed position to another PVP or to another location in the same PVP.

Host processor 45 then needs to access the appended data. Host processor 45 first must mount the data storage volume to an addressed DVE using MOUNT command 49. Since the volume being mounted is an LV, assume that the LV is on a different PVP and at a different longitudinal position on such different PVP. PSC 52 and PVM 57 select the PVP storing the MOUNT command addressed LV for mounting in the addressed DVE the PVP storing the addressed LV. At this time, PSC 52 has a stored indication (not shown), generated while executing the previously received MOUNT command 40 for the addressed LV, that the mounted volume is an LV. This indication directs PSC 52 to actuate PVM 57 for obtaining and/generating control information necessary to correctly position the PVP tape in response to any ensuing host processor 45 issued peripheral command.

In preparation for data processing operations, host processor 45 in step 230 issues the Locate Block ID command using the step 227 provided location information - - - all of which is incorrect for the new LV location. PSC 52 receives and decodes the step 227 supplied locate block ID command. Then, PSC 52 responds to the stored LV indication to actuate PVM 57 to adjust the location information in a manner for quickly and precisely locate the command-identified logical block. PVM 57 responds by locating the VOLSER entry for the mounted LV. PVM 57 reads the location information for the mounted LV for comparing same with the information received with the Locate Block ID command. As one example, assume that the last access to the addressed LV involving a Read Block ID command occurred when the addressed LV resided in a PVP in a half wrap in which the forward direction was indicated by 311 (forward is from the free tape end toward the hub end) and the LV was close to the free end. Next, assume that the LV was moved to a second PVP in which the LV was inserted to reside in a half wrap having a forward direction indicated by arrow 313 (forward is from the hub end toward the free end) and that the LV is near the hub end. In all instances, each LV is physically referenced to BOT such that if any LV is migrated to a PVO the PRV's remain correct. That is, the PRV's of each LV are relative to the PRV of the partition in which such LV resides.

PVM 57 then sends the adjusted values to PSC 52 for enabling PSC 52 to effect the high speed searching to the desired block id. PSC 52 has a table (not shown) of segment sizes for the respective segment numbers (or per range of segment numbers). PSC 52, in step 234, converts the PVM 57 supplied segment numbers into a number of segments to be traversed from the current position, then converts the number of segments into tape distance. PSC 52 then at step 235 commands the addressed DVE to high speed access the block ID using the Milligan et al described high speed search. Upon completion of the high speed search, slow speed (read block IDs while moving) searching completes the operation.

Since each PVP may contain a plurality of LVs to better utilize the capacity of a tape volume, concurrent conflicting access requests to two different LVs residing in a same PVP is an access conflict that has to be efficiently resolved for maintaining subsystem performance. That is, logical volumes residing on the same PVP are not concurrently mountable. FIGS. 14–16 illustrate three solutions to access request conflicts.

To resolve the access request conflicts, either all but one of the mount requests for the multiple LVs must be deferred, possibly creating a deadlock, or all but one of the LVs must be moved to another PVP. If LV movement is chosen, access to any data on the PVP and in the LVs is delayed while the copies are being made.

FIG. 14 illustrates copying one or more of the LVs on one PVP receiving concurrent conflicting access requests to another PVP. At step 240 PVM 57 detects concurrent conflicting access requests to a plurality of LVs residing on one PVP. Each received MOUNT command remains queued until subsystem 48 reaches it for execution, subsystem 48 sends a not ready signal to the requesting host processor(s). At step 242, PVM 57 selects one PVP for each LV to be copied. A criterion is that the target PVP for each LV to be copied is that the target PVP has a same or similar category as the LV it is to receive. Preference in selecting a target PVP is that the PVP is mounted on one of the DVEs 53. In any event, at step 243 PVM 57 effects loading the target PVP(s) on appropriate DVEs. Then, at step 244, upon completing queued commands relating thereto, the first access to an LV residing on the first PVP is interrupted. The LV to be moved are then copied to the respective target PVPs. Copying each LV entails assigning the LV to be moved to a partition on the target PVP (as described above for creating LVs), accessing the respective LV by moving the PVP tape to the LV, then coping the LV to the target PVP followed by updating the FIG. 7 illustrated data base (step 245) to reflect that the moved LV is on the target PVP at the selected starting PRV. This procedure is repeated for each LV to be moved. Upon completing each move of an LV to a target PVP, PSC 52 at step 246 sends a Mount Completed Response to the requesting host processor 45 signifying that access to the requested LV is now available at a DVE 53 mounting the respective target PVP. Upon completing copying the LVs, access to the LVs follows the procedures described herein. Step 247 sends a known LONG BUSY signal to the original host processor. At step 248, for reestablishing access to the original PVP, a no longer busy signal is sent to the original requesting host processor.

FIG. 15 illustrates accessing a target PVP mounted on a DVE via a second PSC. Each subsystem 45 may have a plurality of PSC's 53 that have access to the same DVEs. Since each PSC 53 may have one or two data flow circuits (for processing read and write data signals, error detection and correction, managing control characters, all as known), access to a target PVP may involve two PSCs. Numeral 250 designates the channel connections for the two PSCs PSC-1 numbered 251 and PSC-2 numbered 252. The PSCs have known inter-PSC data connections. In the subsystem, one DVE may be temporarily assigned to act as a different device address. The requesting host processor 45 for a copied LV accesses the copied LV on a target PVP via the PSC-1 connection to PSC-2, using the PSC-2 data flow circuit (not shown) for accessing a DVE 253 that is mounting the target PVP, hence the copied LV. Other known arrangements may also be used.

FIG. 16 shows a host processor "software" procedure that forces any host processor 45 requesting access to a second LV on a PVP that is currently being access for first LV to command copying of the second LV to another PVP. At step 260, PVM 57 detects an access conflict because access to a second LV on a PVP has been received from a host processor. At step 263, PVM 57 notifies PSC 53 to send an error condition signal (UNIT CHECK) to the access-requesting host processor. The UNIT CHECK may indicate that the requested LV is not available but can be made available by requesting a MOUNT of such volume on the same DVE in the subsystem. The second requesting host processor at step 264 has several options to respond to the UNIT CHECK. The second requesting host processor may wait a predetermined time for retrying access to the LV, may abort its current job that caused the access request or may abort a new Job for which the access request was made.

FIG. 17 illustrates appending data to data stored in an LV. Care is exercised not to record any data beyond the extent of the LV, i.e. all recording is contained to the partition that is co-extensive with the LV. Step 280 assumes that PSC 52 is writing data in an addressed LV in a PVP mounted in one of the DVEs 53. During recording in step 280, PSC 52 is continually monitoring in step 281 the position of the tape with respect to the recording transducer (not shown) as by tracking the position by the Milligan et al disclosed reel tachometer or any other known mechanism. If a LEOP (FIG. 4) is detected, recording is immediately aborted and in step 252 a UNIT CHECK is sent to the appending-data commanding host processor. Also, the write-commanding host processor aborts its writing program at step 283 and ends volume processing (writes known so-called trailer labels). Aborting the recording prevents encountering PEOP. The tape device must enforce partition boundary (stop recording) at PEOP. Numeral 284 indicates that the requesting host processor closes the volume and mount another LV before continuing further data processing.

FIG. 18 shows that the logical volume controls of this invention may be practiced, at least in part, on disk data storage physical volumes, such as designated by numerals 300 and 301. The MOUNT message 49 then is applicable to VOLSERs of portable logical data storing volumes - - - i.e. independent of the physical medium. In response to a received MOUNT command 49, PVM 57 creates a new LV, such as LV 305 on disk 300, later a second LV 306 on disk 300 is created in response to a second MOUNT command 49. Therefore, it is seen that the principles of this invention are applicable to diverse media.

While the invention has been particularly shown and described with reference to preferred embodiments thereof, it will be understood by those skilled in the art that various changes in form and details may be made therein without departing from the spirit and scope of the invention.

What is claimed is:

1. Apparatus for storing data peripherally to a host processor, including, in combination:

attachment means for attaching the apparatus to one or more host processors for receiving commands from an attached host processor, exchanging data with the attached host processor and for supplying status information to the attached host processor;

a plurality of host-processor-addressable media drives in said apparatus, each said media drive for removably mounting for reading and writing to and from a physical volume having a record medium;

a plurality of said physical volumes in said apparatus, each of said physical volumes for storing data therein in one or more host-processor-addressable logical data-storage volumes;

volume moving means for inserting and removing said physical volumes into and from said media drives;

volume manager means connected to the attachment means for receiving mount commands from the attached host processor, said mount commands including an address of one of said media drives and a volume serial number of a mount command addressed one of said host-processor-addressable logical data-storage volume to be mounted on said addressed media drive;

peripheral controller means having data flow means connected to the attachment means and to the media drives for processing digital signals between said attachment means and said media drives;

volume map means connected to the volume manager means for storing identifications of said volume serial numbers and indications of which of said physical volumes contain said host-processor-addressable logical data-storage volumes, respectively, as a volume mapping of said host-processor-addressable logical data-storage volumes to said physical volumes;

said volume manager means responding to each of said received mount commands for examining said volume map means for identifying one of said physical volumes storing said mount command addressed one of said host-processor-addressable logical data-storage volumes, first means in the volume manager means for responding to identification of one of said physical volumes storing said mount command addressed one of said host-processor-addressable logical data-storage volumes for effecting mounting of said one physical volume on said addressed media drive; and second means in the volume manager means for responding to identification of none of said physical volumes storing said mount command addressed one of said host-processor-addressable logical data-storage volumes for selecting a second physical volume, volume initialization means in the second means for automatically establishing a new host-processor-addressable logical data-storage volume in said second physical volume to be said mount command addressed one of said host-processor-addressable logical data-storage volumes and for actuating said first means to mount said second physical volume in said addressed media drive.

2. In the apparatus set forth in claim 1, further including, in combination:

said media drives removably mounting said physical volumes, each said media drive removably mounting one of said physical volumes at a time for said reading and writing;

said volume map means having entry means for indicating that first and second host-processor-addressable logical data-storage volumes reside in a first one of said physical volumes;

said volume manager means for actuating said volume moving means for mounting said first one of said physical volumes in a first one of said media drives for enabling a current access to said first host-processor-addressable logical data-storage volume;

said volume manager means responding to a second received mount command for mounting said second host-processor-addressable logical data-storage volume to identify that said mount command requires access to said first one of said physical volumes, said volume manager means having hold means responsive to a current access to of said first one of said host-processor-addressable logical data-storage volume to hold response to said second received mount command until said current access completes;

said volume moving means mounting a second physical volume on a second media drive;

completion means in the peripheral controller means for detecting and indicating completion of said current access; and said volume manager means having conflict means connected to said completion means for responding to said hold means and to completion of said current access to access said first one of said mounted first physical volumes to copy said first host-processor-addressable logical data-storage volume from said first physical volume to said mounted second physical volume and to update said volume map means for identifying said second addressable host-processor-addressable logical data-storage volume being in said mounted second physical volume and for removing said hold response such that both said first and second addressable logical data-storage volumes can be simultaneously accessed.

3. In the apparatus set forth in claim 1, further including, in combination:

said volume map means indicating that first and second host-processor-addressable logical data-storage volumes reside in a first one of said physical volumes;

said volume manager means mounting said first one of said physical volumes in a first one of said media drives for enabling a current access to said first host-processor-addressable logical data storage volume;

said volume manager means responding to said received mount command for said second host-processor-addressable logical data-storage volume to identify that said mount command requires access to said first one of said physical volumes, said volume manager means having hold means responsive to said current access to of said first one of said host-processor addressable logical data storage volumes to hold response to said mount command until said current access completes;

completion means in said peripheral controller means for detecting completion of said current access;

said attachment means having a plurality of paths over which data may be transmitted, said first media drive being connected to a first one of said paths; and said volume manager means having conflict means connected to said completion means for responding to said hold means and completion of said current access to connect said first media drive to a second one of said paths for enabling access to said second one of said host-processor addressable logical data storage volumes.

4. In the apparatus set forth in claim 1, further including, in combination:

said volume map means identifying a first sub-plurality of said physical volumes as partitioned physical volumes, each of said first sub-plurality of said physical volumes having a respective VOLID volume serial number and a visually sensible copy of said respective VOLID volume serial number, all of said VOLID volume serial numbers of said first sub-plurality of said physical volumes being unique such that none of the VOLID serial numbers in said first sub-plurality of physical volumes are duplicated;

a set of unique VOLSER volume serial numbers for identifying respective ones of said host-processor-addressable logical data-storage volumes, a first predetermined subset of said VOLSER volume serial numbers being different from any of said VOLID volume serial numbers;

said volume map means further indicating that first predetermined ones of said VOLSER volume serial numbers in said first predetermined subset respectively identify ones of said host-processor-addressable logical data-storage volumes residing on predetermined ones of said first sub-plurality of physical volumes, a given plurality of said first sub-plurality of physical volumes storing a plurality of said host-processor-addressable logical data-storage volumes and a predetermined plurality of said VOLSER volume serial numbers not identifying any host-processor-addressable logical data-storage volumes; and first predetermined received ones of said mount command respectively indicating respective ones of said first predetermined set of said VOLSER volume serial numbers.

5. In the apparatus set forth in claim 4, further including, in combination:

said volume map means further identifying a second sub-plurality of said physical volumes as physical-only physical volumes, each of said physical-only physical volumes having a visual-sensible indication of a respective VOLID volume serial number, all of said VOLID volume serial numbers being a unique number and different from said first predetermined first VOLSER volume serial numbers;

said set of said unique VOLSER volume serial numbers having a second predetermined subset of said VOLSER volume serial numbers being identical to said VOLID volume serial numbers for said second sub-plurality of physical volumes;

each of said physical-only physical volumes having a VOLSER volume serial number in said second set of VOLSER volume serial numbers recorded therein that is identical to the respective VOLID volume serial number; and given predetermined ones of said received mount commands indicating respective ones of said VOLID identical VOLSER volume serial numbers such that said physical volumes having a VOLID in said first sub-plurality of physical volumes are addressable by said apparatus but not addressable by said host processor.

6. In the apparatus set forth in claim 5, further including, in combination:

each of said physical volumes for movably mounting a data storage medium;

each of said media drives having medium displacement indicating means for indicating displacement of said data storage medium of a physical volume mounted therein from a medium reference position of the data storage medium in each said media drive for indicating displacement of the data storage medium from said reference position;

said peripheral controller means having means for detecting and indicating a block ID and a first displacement location from said medium reference position of a first one of the host-processor-addressable logical data-storage volumes having a first VOLSER recorded on said mounted medium and being connected to the medium displacement indicating means for reading and storing the block ID and said first displacement location and means for supplying said block ID, said first displacement location of said first one of the host-processor-addressable logical data-storage volumes having said first VOLSER to a one of said host processors as a first position indicating reference value in said mounted data storage medium;

said peripheral controller means actuating said volume moving means and said media means to copy said first VOLSER identified host-processor-addressable logical data storage volume to a second displacement location on a second one of said first sub-plurality of said physical volumes, said volume manager means receiving from said peripheral controller means an indication of said second displacement location for said first VOLSER host-processor-addressable logical data storage volume;

said volume moving means mounting said second one of the first sub-plurality of said physical volumes in a second one of said media drives;

said attachment means receiving a locate command for commanding the peripheral controller means to position said medium having said first VOLSER host-processor-addressable logical data storage volume;

said peripheral controller means responsive to said received locate command for actuating the volume manager means to change the physical position indicated in the locate command to said second physical location on said second one of said first sub-plurality of said physical volumes; and said peripheral controller means actuating said second one of said media drives to position the medium in the mounted physical data storage volume to said second displacement location.

7. In the apparatus set forth in claim 1, further including, in combination:

initialization means connected to said volume manager means for actuating the volume manager means to enter volume serial number data into said volume map means, said initialization means including:

first data means for actuating said volume manager means to insert identifying data into said volume map means for identifying a first sub-plurality of said physical volumes as partitioned physical volumes, each of said first sub-plurality of said physical volumes having a respective VOLID volume serial number and a visually sensible copy of said respective VOLID volume serial number, all of said VOLID volume serial numbers of said first sub-plurality of said physical volumes being unique such that none of the VOLID serial numbers in said first sub-plurality of physical volumes are duplicated;

second data means for actuating said volume manager means to insert identifying data into said volume map means for identifying a set of unique VOLSER volume serial numbers for identifying respective ones of said host-processor-addressable logical data-storage volumes, a first predetermined subset of said VOLSER volume serial numbers being different from any of said VOLID volume serial numbers;

third data means for actuating said volume manager means to insert identifying data into said volume map means for further indicating that first predetermined ones of said VOLSER volume serial numbers in said first predetermined subset respectively identify ones of said host-processor-addressable logical data-storage volumes that are to reside on ones of said first sub-plurality of physical volumes wherein said first sub-plurality of physical volumes are for storing a plurality of said host-processor-addressable logical data-storage volumes; and fourth data means connected to a host processor that is connected to said attachment means for supplying VOLSER data to a host processor all of said VOLSER volume serial numbers as identifying host-processor-addressable logical data-storage volumes whether or not any respective ones of said VOLSER volume serial numbers actual identify a host-processor-addressable data-storage volume such that the volume manager means can respond to said received mount command to create a host-processor-addressable logical data-storage volume using said VOLSER volume serial numbers in said volume map means.

8. In the apparatus set forth in claim 7, further including, in combination:

fifth data means for actuating said volume manager means to insert into said volume map means identifying data for identifying a second sub-plurality of said physical volumes as physical only physical volumes in which each of said physical only physical volumes are to have a visual-sensible indication of a respective VOLID volume serial number, all of said VOLID volume serial numbers being a unique number;

said set of unique VOLSER volume serial numbers having a second predetermined subset of said VOLSER volume serial numbers being identical to said VOLID volume serial numbers for said second sub-plurality of physical volumes; and each of said physical-only logical data-storage volumes having one of said VOLSER serial numbers of said second predetermined subset recorded therein for machine sensing and that is equal to the VOLID volume serial number of said respective physical only data storage volume.

9. In the apparatus set forth in claim 7, further including, in combination:

said initialization means being in one of said host processor means, said initialization means for sending an initialization command to said attachment means that contains the data from said initialization means first through fourth data means for actuating the volume manager means to insert said identifying data into said volume map means; and said volume manager means having means connected to said attachment means for receiving said initialization command for responding to said initialization command for inserting said identifying data into said volume map means.

10. The apparatus set forth in claim 1 further including, in combination:

each of said physical volumes movably mounting a data storage medium, said storage medium being an elongated flexible magnetic data storage tape;

each of said media drives having medium displacement detecting and indicating means for detecting and indicating displacement of a medium of a physical volume mounted therein from a beginning of a medium reference position as an indicated position of said magnetic data storage tape;

said peripheral controller means having segment means for indicating a plurality of addressable segments in said magnetic data storage tape;

said peripheral controller means having means for detecting and indicating a block ID of data recorded on said mounted medium and being connected to the medium displacement indicating means for reading and storing the block ID and the indicated position from said reference position and means for supplying said block ID, said indicated position indicating a first one of the host-processor-addressable logical data-storage volumes having a first VOLSER to a one of said host processors as a first position reference value in said mounted medium; and said second means of said volume manager means having volume assignment means for assigning respective one of said host-processor-addressable logical data-storage volumes to predetermined ones of said segments, said volume manager means establishing in said volume map means a volume map of said host-processor-addressable logical data-storage volumes assigned to and identifying said physical volumes in which said assigned host-processor-addressable logical data-storage volumes respectively reside, said assignment means including means for assigning one of said host-processor-addressable logical data-storage volume to a plurality of contiguous ones of said segments.

11. The apparatus set forth in claim 10, further including, in combination;

partition means in the volume manager means for clustering a plurality of contiguous ones of said segments into respective media drive addressable partitions; and said volume assignment means being connected to the partition means for assigning said host-processor-addressable logical data-storage volumes to predetermined respective ones of said partitions.

12. In the apparatus set forth in claim 11, further including, in combination:

said partition means clustering a predetermined number of said segments in respective ones of said partitions in a predetermined one of said physical volumes.

13. In the apparatus set forth in claim 11, further including, in combination:

said partition means clustering a variable number of said segments in predetermined ones of said partitions, respectively, such that said partitions in each said physical volume have a different number of said segments such that said assigned host-processor-addressable logical data-storage volumes in each of said predetermined ones of the physical volumes have different data storage capacities.

14. In the apparatus set forth in claim 11, further including, in combination:

said magnetic tape having a plurality of data storage tracks arranged in a serpentine pattern such that a forward tape scanning direction in a first subset of the data storage tracks is from a free end of said magnetic tape to a hub end of said magnetic tape and a forward tape scanning direction in a second subset of the data storage tracks if from said hub end toward said free end, said first and second subsets including tracks in a respective half-wraps that are interleaved across the magnetic tape laterally to the longitudinal length of the magnetic tape such that scanning the first subset of data storage tracks result in counting said segments in a first direction of count and scanning the second subset of data storage track results in counting said segment in a second direction of count that is reverse to said first direction, one of said directions of count being an ascending count.

15. In the apparatus set forth in claim 14, further including, in combination:

data base means in said volume manager means for indicating a volume mapping in the apparatus, said data base means establishing and maintaining said volume mapping for each host-processor-addressable logical data-storage volume that includes:

its respective VOLSER volume serial number, type of volume as being physical or logical, VOLID of the physical volume in which the host-processor-addressable logical data-storage volume resides;

status of each said host-processor-addressable logical data-storage volume as to whether or not the host-processor-addressable logical data-storage volume is mounted in an addressed one of said media drives, whether or not that a mount command has been received for each said host-processor-addressable logical data-storage volume;

identifications of the starting and ending segments of the medium in which the host-processor-addressable logical data-storage volume resides; and a storage location of the VOLID identified physical volume whilst the identified physical volume is demounted.

16. In the apparatus set forth in claim 15, further including, in combination:

said volume map means identifying a first sub-plurality of said physical volumes as partitioned physical volumes, each of said first sub-plurality of said physical volumes having a respective VOLID volume serial number and a visually sensible copy of said respective VOLID volume serial number, all of said VOLID volume serial numbers of said first sub-plurality of said physical volumes being unique such that none of the VOLID serial numbers in said first sub-plurality of physical volumes are duplicated;

a set of unique VOLSER volume serial numbers for identifying respective ones of said host-processor-addressable logical data-storage volumes, a first predetermined subset of said VOLSER volume serial numbers being different from any of said VOLID volume serial numbers;

said volume map means further indicating that first predetermined ones of said VOLSER volume serial numbers in said first predetermined subset respectively identify ones of said host-processor-addressable logical data-storage volumes residing on predetermined ones of said first sub-plurality of physical volumes, a given plurality of said first sub-plurality of physical volumes storing a plurality of said host-processor-addressable logical data-storage volumes and a predetermined plurality of said VOLSER volume serial numbers not identifying any host-processor-addressable logical data-storage volumes;

first predetermined received ones of said mount commands indicating respective ones of said first predetermined set of said VOLSER volume serial numbers for commanding mounting respective ones of said host-processor-addressable logical data-storage volumes in predetermined addressed ones of said media drives;

said volume map means responding to said received ones of said mount commands to identify predetermined ones of said physical volumes to be mounted respectively to said addressed ones of said media drives;

said volume moving means responding to said volume map means for moving said identified predetermined ones of say physical volumes respectively to said addressed ones of said media drives as mounted physical volumes;

each of said media drives having magnetic tape medium displacement indicating means for indicating displacement of said magnetic tape medium of each of said mounted physical volumes from a beginning of a medium reference position that is a beginning of tape immediately adjacent a free end of the magnetic tape medium and remote from a hub end of the magnetic tape medium;

said peripheral controller means having means for detecting and indicating a block ID of data recorded on said mounted magnetic tape medium and indicating a displacement location of said magnetic tape medium from said medium reference position and being connected to the magnetic tape medium displacement indicating means for reading and storing the block ID and said indicated displacement location from said reference position and means for supplying said block ID, said indicated displacement location for indicating a first one of the host-processor-addressable logical data-storage volumes having a first VOLSER to one of said host processors as a first position reference value in said mounted magnetic tape medium;

said peripheral controller means actuating said volume moving means and said media drives to copy said first VOLSER identified host-processor-addressable logical data-storage volume to a different displacement position on a different one of said first sub-plurality of said physical volumes, said volume manager means receiving from said peripheral controller means an indication of said different displacement location for said first VOLSER host-processor-addressable logical data-storage volume;

said volume moving means mounting said different one of the first sub-plurality of said physical volumes on one of said media drives as a second mounted physical volume;

said attachment means receiving a locate command from one of said attaching host processors for commanding the peripheral controller means to position said magnetic tape medium having said first VOLSER host-processor-addressable logical data-storage volume;

said peripheral controller means being responsive to said received locate command for actuating said volume manager means to change the displacement location indicated in the locate command to said different displacement location on said different one of said physical volumes; and said peripheral controller means actuating the one media drive to position the magnetic tape medium in the second mounted physical data storage volume to said different displacement location.

17. In the apparatus set forth in claim 16, further including, in combination:

said attachment means actuating the peripheral controller means for appending data to data stored in an addressed one of host-processor-addressable logical data-storage volumes residing in a predetermined partition of one of the physical volumes with another host-processor-addressable volume in a predetermined one of said partitions such that the addressed host-processor-addressable logical data-storage volume has a predetermined data storage capacity;

said peripheral controller means having write means for writing data into said addressed volume; and monitoring means in the peripheral controller means for monitoring said medium displacement indicating means for writing data near an end of said predetermined partition, said monitoring responding to said medium displacement indicating means indicating an approach of one end of said predetermined partition to signal the peripheral controller means to stop writing.

18. In the apparatus set forth in claim 17, further including, in combination:

said peripheral controller means having means connected to said monitoring means for responding to said approach indication to indicate to the attachment means that the writing is aborted;

said attachment means responding to said aborted writing to stop all data transfers to the peripheral controller means and to actuate the peripheral controller means to abort the writing; and said peripheral controller means having recover means connect to the attachment means for responding to the attachment means for mounting a second logical volume for receiving said data being appended in the addressed one of the host-processor-addressable logical volumes to be stored in said second logical volume.

19. In the apparatus set forth in claim 18, further including, in combination;

said volume increasing means having means for accessing said data base means for determining the length of segments in the partition in which said addressed host-processor-addressable logical data-storage volume resides; and said volume increasing means responding to the accessing means for creating said predetermined partition using segments having a greater longitudinal lengths than the determined longitudinal lengths.

20. In the apparatus set forth in claim 17, further including, in combination;

logical volume increasing means connected to said monitoring means for responding to said approach indication to abort said data appending for assigning a new logical volume to receive said data to be appended.

21. In the apparatus set forth in claim 15, further including, in combination:

eject means in the volume manager means for indicating that given ones of said physical volumes are ejectable from the apparatus as respective identified ejectable physical volumes;

media storage means connected to said volume moving means for yielding and receiving said physical volumes for transport to and from the respective media drives, said media storage means having an IO station connected to the volume moving means for yielding and receiving certain ones of said physical volumes to and from the media storage means and having a manual input and manual output port;

said peripheral controller means having migrate initiating means connected to the eject means for selecting and indicating a given number of said identified ejectable physical volumes for migrating addressed ones of said host-processor-addressable logical data-storage volumes to said IO station;

said volume manager means having migrate controlling means connected to said migrate initiating means for accessing said data base means for identifying all of said addressed ones of said host-processor-addressable logical data-storage volumes;

said migrate controlling means responding to the migrate initiating means indicating that all of the addressed ones of said host-processor-addressable logical data-storage volumes to actuate the peripheral controller means to move said addressed ones of the host-processor-addressable logical volumes to said identified ejectable physical volumes and then to actuate the volume moving means to move said identified ejectable physical volumes to said IO station; and said volume manager means responding to said migrate controlling means to update said data base means.

22. In the apparatus set forth in claim 15, further including, in combination:

said data base means having first and second portions, each said portions having a plurality of entries for identifying data-storage volumes;

said first portion having a plurality of physical-volume-identifying ones of said entries, each of said physical-volume-identifying entry having a volume id VOLID field for storing data identifying the respective physical volume;

said second portion having a plurality of host-processor-addressable identifying ones of said entries, each of said host-processor-addressable identifying entries having a volume serial number field VOLSER for storing data that identifies a volume serial number in a range of volume serial numbers automatically assignable to a respective one of said host-processor-addressable logical data-storage volumes, said each said host-processor-addressable identifying entry including pointer means for pointing to another host-processor-addressable identifying entry such that linked lists of said host-processor-addressable identifying entries exist, one linked list for each of said first portion entries identifying a respective physical volume storing a host-processor-addressable logical data-storage volume;

said first portion entries including a pointer means pointing to respective ones of said second portion entries for respectively indicating that a host-processor-addressable logical data-storage volume is stored in said respective physical volume; and each of said second portion entries in a linked list including an identification of the VOLID of a respective one of said physical volumes storing a host-processor-addressable logical data-storage volume identified in said each second portion entry.

23. In the apparatus set forth in claim 15, further including, in combination:

eject means in the volume manager means for identifying ejectable ones of said physical volumes as migrate volumes;

media storage means connected to said volume moving means for yielding and receiving said migrate volumes for transport to and from the respective media drives;

an IO station in the media storage means for yielding and receiving said migrate volumes to and from said volume moving means and having a manual port for manually receiving and yielding said migrate volumes;

said peripheral controller means having migrate initiating means for actuating said volume manager means to migrate an addressed one of said host-processor-addressable logical data-storage volumes that resides in a given one of said physical volumes, said addressed one of said host-processor-addressable logical data-storage volumes being a certain logical volume;

said volume manager means having migrate controlling means connected to said migrate initiating means for accessing said data base means for identifying said certain logical volume as being stored in first one of said physical volumes; and said migrate controlling means responding to the request to migrate initiating means indicating that said certain logical volume is to be migrated for first selecting a given one of said migrate volumes as a selected migrate volume and then actuating the peripheral controller means to move said certain logical volume from said first one of said physical volumes to said selected migrate volume, then actuating the volume manager means to delete said VOLID of said one of said physical volumes from said data base means to update said data base means to show that the certain logical volume is disassociated from said first one of said physical volumes.

24. In the apparatus set forth in claim 15, further including, in combination:

media storage means connected to said moving means for yielding and receiving said magnetic tape physical volumes for transport to and from the respective media drives;

an IO station in the media storage means for yielding and receiving physical volumes to and from said volume moving means and having a manual port for manually receiving and yielding physical volumes;

said peripheral controller means having migrate command means connected to the attachment means for receiving host-processor issued migrate commands from the attachment means that indicate a VOLSER volume serial number for identifying one of host-processor-addressable logical data-storage volumes to be migrated;

said migrate command means connected to the volume manager means for verifying that the migrate command VOLSER volume serial number is for either a host-processor-addressable logical data-storage volume that resides by itself in a physical volume or resides with other host-processor-addressable logical data-storage volumes in one physical volume, said migrate command means rejecting the migrate command if the migrate command is received in a first transmission of said migrate command from said attachment means and accepting the migrate command if it is a second transmission by said attachment means of said received migrate command, said migrate command means actuating said attachment means to reject the migrate command on said first reception of said migrate command and to accept the migrate command on its second reception;

said peripheral controller means having migrate initiating means connected to the migrate command means for responding to said accepted migrate command for actuating said volume manager means to migrate an addressed one of said host-processor-addressable logical data-storage volumes that reside in said one of said physical volumes;

said volume manager means having migrate controlling means connected to said migrate initiating means for accessing said data base means for identifying said migrate command VOLSER identified volume stored in one of said physical data storage volume; and said migrate controlling means responding to the request to migrate initiating means indicating that said migrate command VOLSER identified volume is to be migrated for actuating the peripheral controller means to move said migrate command VOLSER identified host-processor-addressable logical data-storage volume from said one physical volume to another physical volume, then actuating the volume moving means to move said another physical volume to said IO station and then actuate said volume manager means to update said data base means.

25. The apparatus as set forth in claim 11, further including, in combination:

said second means of said volume manager means having first format means for recording in said second physical volume a format identification mark that indicates the second physical volume will receive and store one or more first predetermined host-processor-addressable logical data-storage volumes; and said second means of said volume manager means having second format means for recording in respective ones of said partitions that receive and store a respective ones of said first predetermined host-processor-addressable logical data-storage volumes to record in said respective partitions a format identification that indicates a respective one of said first predetermined host-processor-addressable logical data-storage volumes.

26. The apparatus set forth in claim 11, further including, in combination:

the tape having first and second longitudinal ends;

said partition means clustering, beginning at said first end of said tape and clustering into partitions only contiguous ones of said segments; and creating said partitions beginning at said first end of said tape and proceeding toward said second end of the tape to be contiguous such that segments that are not assigned to any partitions are all located between a predetermined one of said partitions and said second end of the tape.

27. The apparatus set forth in claim 1, further including, in combination:

affinity means in the data base means for indicating that first predetermined ones of said host-processor-addressable logical data-storage volumes having respective affinity properties that are identical with affinity properties of second predetermined ones of said host-processor-addressable logical data-storage volumes; and said second means having volume assignment means connected to the affinity means for assigning said first predetermined ones of said host-processor-addressable logical data-storage volumes to respective ones of a set of a plurality of said physical volumes that include said indicated affinity.

28. The apparatus set forth in claim 27, further including, in combination:

said indicated affinity means indicating that a minimal number of said host-processor-addressable logical data-storage volumes are to reside in each of said plurality of physical volumes in a first set; and volume assignment means in said volume manager means for selecting one of said plurality of said physical volumes that includes a minimal number of said host-processor-addressable logical data-storage volumes for receiving and storing said mount command indicated host-processor-addressable logical data-storage volume.

29. The apparatus set forth in claim 27, further including, in combination:

said indicated affinity means indicating that a maximal number of said host-processor-addressable logical data-storage volumes are to reside in a minimal number of said plurality of physical volumes in said set; and said volume assignment means selecting one of said plurality of said physical volumes that includes a maximal number of said host-processor-addressable logical data-storage volumes for receiving and storing said mount command indicated host-processor-addressable data storage volume.

30. The apparatus set forth in claim 1, further including, in combination:

said mount command indicating a category for said mount command identified host-processor-addressable data storage volume, said indication being a volume serial number residing in one of a plurality of ranges of volume serial numbers that respectively indicate said category;

said volume manager means having data base means for maintaining category indications for said host-processor-addressable logical data-storage volumes;

said data base means being connected to said second means and being responsive to said second means for identifying ones of said physical volumes that include a host-processor-addressable logical data-storage volume having said mount command indicated category and for indicating to the second means one of said identified physical volumes as said second physical volume; and said data base means category indications including a stack category for indicating erased physical volumes that are to store a plurality of said host-processor-addressable logical data-storage volumes, a scratch category for indicating erased physical volumes that are to store a single host-processor-addressable logical data storage volume; physical volumes that are storing one of said host-processor-addressable logical data-storage volumes and that was previously had a scratch category and physical volumes that are in a partition category that respectively are storing one or more of said a plurality of said host-processor-addressable logical data-storage volumes.

31. The apparatus set forth in claim 1, further including, in combination:

an automatic media library connected to said peripheral controller means for receiving commands for fetching and storing ones of said physical volumes as commanded ones of said physical volumes, said media library having addressable storage compartments for said physical volumes, respectively;

an IO station in the media library;

said volume moving means being automatic physical volume moving means in said media library and being connected to said IO station for inserting and removing commanded ones of said physical volumes; and media storage shelves disposed in a predetermined proximity to said IO station such that said commanded ones of said physical volumes can be manually transported between said media storage shelves and said IO station.

32. The apparatus set forth in claim 1, further including, in combination:

a dedicated media drive connected to said volume moving means for receiving and ejecting physical volumes from and to said volume moving means;

said dedicated media drive being addressable only by said peripheral controller means; and said volume manager means actuating said peripheral controller means to select said dedicated media drive each time one of said host-processor-addressable logical data-storage volumes is to be copied between two of said physical volumes.

33. The apparatus set forth in claim 1, further including, in combination;

said host processors having a system volume catalog of said host-processor-addressable logical data-storage volumes that includes a plurality of volume serial numbers for said host-processor-addressable logical data-storage volumes including volume serial numbers that identify no host-processor-addressable data-storage volume in said volume map means, said volume serial numbers being arranged into groups that each respectively indicate a predetermined category of host-processor-addressable logical data-storage volumes; and said system volume catalog having no volume serial numbers of said physical volumes.

34. A method of operating a peripheral data-storage sub-system, programmed control means in the peripheral data-storage sub-system for controlling its operation and attachment means connected to the control means for attaching the sub-system to a host processor, a plurality of addressable media devices for removably receiving physical volumes of data-storage media, means connected to the control means and to the media devices for mounting and demounting said physical volumes of data-storage media, said media devices being connected to the attachment means for exchanging data signals therewith, the method including steps:

establishing a plurality of volume serial numbers;

establishing a listing in said control means containing indications of a first set having a plurality of first ones of said volume serial numbers that are to be used only for identifying host-processor-addressable logical data-storage volumes and establishing a second set of second ones of said volume serial numbers that are to be used only to identify stack ones of said physical volumes in which said host-processor-addressable logical data-storage volumes can reside;

first initializing first predetermined ones of said host-processor-addressable logical data-storage volumes including first allocating a predetermined partition of predetermined ones of said physical volumes for respective ones of first predetermined ones of said host-processor-addressable logical_data-storage volumes and establishing addressability of said first predetermined ones of said host-processor-addressable logical data-storage volumes by inserting predetermined respective ones of said volume serial numbers of said first set in said host-processor-addressable logical data-storage volumes on respective ones of said predetermined ones of said physical volumes, said first predetermined ones of said host-processor-addressable logical data-storage volumes being fewer than a number of said established first volume serial numbers;

in said control means, listing said first predetermined ones of said host-processor-addressable logical data-storage volumes having said first volume serial numbers, respectively, and identifying, respectively, said first predetermined ones of said host-processor-addressable logical data-storage volumes and said physical volumes in which the respective first predetermined ones of said host-processor-addressable logical data-storage volumes reside;

receiving a mount command from an attached host processor into said control means that includes an addressed of one of said media devices and an addressed volume serial number, in said control means checking said listing for determining whether or not a first predetermined one of said host-processor-addressable logical data-storage volumes is identified by said addressed volume serial number, if said checking shows that none of said first predetermined ones of said host-processor-addressable logical data-storage volumes is identified by said addressed volume serial number, then selecting one of said physical volumes having one of said second volume serial numbers for identifying in said listing said selected one physical volume by said addressed volume serial number in addition to said one second volume serial number;

mounting said selected one physical volume in said addressed media device;

then, allocating a predetermined addressable partition of said selected one physical volume for receiving and storing a host-processor-addressable logical data-storage volume having said addressed volume serial number and then recording in said allocated partition of said selected physical volume said addressed volume serial number such that said allocated partition is addressable as an initialized one host-processor-addressable logical data-storage volume by said addressed volume serial number;

then, recording in said selected one physical volume an index to said one host-processor-addressable logical data-storage volume that includes an address of said allocated addressable partition whereby said one host-processor-addressable logical data-storage volume is initialized;

then updating said listing for showing that said addressed volume serial number identifies said one logical data-storage volume and that said one logical data-storage volume resides in said selected physical volume;

if said addressed volume serial number is identified in said listing, then selecting a second one of said physical volumes identified in said listing by said addressed volume serial number for mounting in said addressed media device;

then mounting said first selected physical volume in said addressed media device as being said logical data-storage volume; and if said checking shows that the addressed volume serial number is not a volume serial number in said first plurality of serial numbers, rejecting the received mount command as not identifying any one of said host-processor-addressable logical data-storage volumes, including if said received mount command identifies a volume serial number in said second plurality of volume serial numbers.

35. The method set forth in claim 34, further including, the steps of:

establishing in said sub-system a scratch set of a given plurality of third ones of said physical volumes;

establishing in said listing a third set of volume serial numbers for identifying a third set of said host-processor-addressable logical data-storage volumes, each of said third set of volume serial numbers for identifying a host-processor-addressable logical data-storage volume to reside alone on one of said scratch physical volumes;

receiving a second mount command from an attached host processor into said control means that includes an addressed of one of said media devices and a second addressed volume serial number that is one of said third volume serial numbers, in said control means checking said listing for determining whether or not an initialized one of said third volume serial number identified host-processor-addressable logical data-storage volumes is identified by said second addressed volume serial number;

if said checking shows that no initialized host-processor-addressable logical data-storage volume is identified by said second addressed volume serial number, then selecting and mounting in said addressed media device a predetermined one of said scratch physical volumes;

then, recording on said mounted predetermined one of said scratch physical volumes said second volume serial number, allocating the entirety of said mounted predetermined one of said scratch physical volumes for said host-processor-addressable logical data-storage volume and then identifying said predetermined one of said scratch physical volumes using said second addressed volume serial number;

if said checking shows that an initialized host-processor-addressable logical data-storage volume is identified by said second addressed volume serial number;

then selecting and mounting in said addressed media device one of said physical volumes identified in said listing as storing said one host-processor-addressable logical data-storage volume residing on said selected one physical volume; and command rejecting only those received mount commands not identifying any volume serial number in said first, second or third sets of volume serial numbers.

36. The method set forth in claim 34, further including the steps:

establishing a data base in said control means, including said listing as a part of said data base:

in said data base, maintaining a status of each of the host-processor-addressable logical data-storage volumes hereafter data-storage volume, that indicates whether or not each said data-storage volume is mounted in an addressed one of said media devices, a request to mount has been received, and a location whereat each of said data-storage volumes is stored when not mounted in one of said media devices; and further maintaining in data base identifications of a physical location of each of said allocated partitions for said data-storage volumes.

37. The method set forth in claim 36, further including the steps:

maintaining in said data base an indication that first and second data-storage volumes reside in a first one of said physical volumes;

mounting said first one of said physical volumes in a first one of said media devices for enabling a current access to said first data-storage volume;

receiving in the control means from the attachment means a mount command for said second data-storage volume to be mounted on a second one of said media devices;

holding in said control means a response to said received mount command;

mounting on a second one of said media devices a second physical volume;

detecting completion of said current access to said first data-storage volume;

copying from said first physical volume to said second physical volume said second data-storage volume and updating said data base to show that said second data-storage volume resides in said second physical volume and erasing any indication of said data-storage volume residing in said first physical volume; and updating said data base to show that said second physical volume is mounted on said second one of said media devices; and in the control means supplying an indication to the attachment means that said second data-storage volume is mounted on said second one of said media devices and is ready to be accessed.

38. The method set forth in claim 36, further including the steps:

indicating in said data base that first and second data-storage volumes reside in a first one of said physical volumes;

mounting said first one of said physical volumes in a first one of said media devices for enabling a current access to said first data-storage volume;

in said control means, receiving from said attachment means a second mount command to mount said second data-storage volume in a second one of said media devices;

holding any response to said second mount command from said control means until said current access to the first physical volume is completed;

detecting that said current access is completed;

establishing a plurality of paths over which data may be transmitted from any of said media devices to said attachment means including establishing a first path from the attachment means to said first media device; and connecting said first media device to a second one of said while the first physical volume is mounted in said first media device.

39. The method set forth in claim 34 wherein the peripheral data-storage sub-system includes media storage means having physical volume moving means for yielding and receiving said physical volumes for transport between the respective media devices and physical volume storage compartments of said media storage means, said media storage means having an IO station connected to the physical volume moving means for yielding and receiving magnetic data-storage volumes to and from the media storage means and having a manual input and manual output port, the method further including the steps:

in said data base means identifying first ones of said physical volumes that are other than said stack ones of said physical volumes as ejectable volumes;

initiating migrating a first one of said host-processor-addressable logical data-storage volumes to said IO station;

accessing said data base for identifying as a source physical volume which of said stack physical volumes is storing said host-processor-addressable logical data-storage volume;

selecting and mounting one of said ejectable volumes in one of said media devices as a migrate volume;

copying said first one of said host-processor-addressable logical data-storage volumes to said migrate volume;

updating said data base to indicate that said copied first one of said host-processor-addressable logical data-storage volumes resides in said migrate volume and does not reside in said source physical volume; and in the control means responding to the updated data base indicating that said one host-processor-addressable logical data-storage volume residing in said migrate volume to migrate the copied host-processor-addressable logical data-storage in said migrate volume first media device to said IO station and to update said data base to indicate that said copied host-processor-addressable logical data-storage volume no longer exists and indicating that the copied host-processor-addressable logical data-storage volume is in said migrate volume and is identifiable by a volume ID of said migrate volume.

40. The method set forth in claim 34, including the steps:

establishing a data base in said control means, including said listing as a part of said data base:

in said data base, maintaining a status of each of the physical data-storage volumes and each of the hostprocessor-addressable logical data-storage volumes, hereafter data-storage volumes, that indicates whether or not each said data-storage volume is mounted in an addressed one of said media devices, a request to mount has been received, and a location whereat each of said data-storage volumes is stored when not mounted in one of said media devices;

dividing said data base into first and second portions, in each said portion establishing a plurality of entries for identifying said data-storage volumes;

in said first portion establishing a plurality of physical-volume-identifying ones of said entries, in each of said physical-volume-identifying entries inserting a volume id VOLID field for storing data identifying the respective physical volume;

in said second portion establishing a plurality of host-processor-addressable identifying ones of said entries, in each of said host-processor-addressable identifying entries inserting a volume serial number field VOLSER for storing data that identifies a volume serial number in a range of volume serial numbers automatically assignable to a respective one of said host-processor-addressable identifying logical data-storage volumes;

in said each said host-processor-addressable identifying entry inserting pointer means for pointing to another host-processor-addressable identifying entry such that linked lists of said host-processor-addressable identifying entries exist; establishing one of said linked lists for each of said first portion entries identifying a respective physical volume storing a host-processor-addressable logical data-storage volume;

in said first portion entries inserting a pointer value pointing to respective ones of said second portion entries for respectively indicating that a host-processor-addressable logical data-storage volume is stored in said respective physical volume; and in each of said second portion entries in one of said linked lists inserting an identification of the VOLID of a respective one of said physical volumes storing a respective host-processor-addressable logical data-storage volume identified in said each second portion entry.

41. The method set forth in claim 34 wherein the peripheral data-storage system includes media storage means having physical volume moving means for yielding and receiving said physical volumes for transport between the respective media devices and physical volume storage compartments of said media storage means, said media storage means having an IO station connected to the physical volume moving means for yielding and receiving magnetic data-storage volumes to and from the media storage means and having a manual input and manual output port, the method further including the steps:

identifying predetermined ones of said physical volumes as ejectable physical volumes and identifying all other physical volumes excepting said ejectable physical volumes as non-ejectable physical volumes;

initiating migration an addressed one of said host-processor-addressable logical data-storage volumes to said manual output port, identifying said addressed one of said host-processor-addressable logical data-storage volumes as a certain volume;

accessing said listing for indicating that said certain volume is stored in first one of said physical volumes that is a non-ejectable physical volume;

then selecting a given one of said ejectable physical volumes as a migrate volume;

mounting said migrate volume on a first one of said drives;

mounting said first one of the physical volumes on a second one of said drives;

moving said certain volume from said first one of the physical volumes to said migrate volume;

then updating said listing to show that the certain volume is disassociated from said first one physical volume by deleting a VOLID of said one physical volume from said listing for said certain volume;

then migrating said migrate volume to said manual output port; and updating the listing to indicate said migrate volume and its data content are migrated from the peripheral data-storage system.

42. The method set forth in claim 34 wherein the peripheral data-storage sub-system includes media storage means having physical volume moving means for yielding and receiving said physical volumes for transport between the respective media devices and physical volume storage compartments of said media storage means, said media storage means having an IO station connected to the physical volume moving means for yielding and receiving magnetic data-storage volumes to and from the media storage means and having a manual input and manual output port, the method further including the steps:

establishing in said subsystem a scratch set of a given plurality of third ones of said physical volumes;

establishing in said data base a third set of volume serial numbers for identifying a third set of said host-processor-addressable logical data-storage volumes, each of said third set of volume serial numbers for identifying a host-processor-addressable logical data-storage volume to reside alone on one of said scratch physical volumes;

initiating migrating a predetermined one of said host-processor-addressable logical data-storage volumes from the peripheral data-storage sub-system to said IO station for moving the one category host-processor-addressable logical data-storage volumes outside the peripheral data-storage sub-system;

accessing said data base for identifying a transfer physical volume containing said predetermined one host-processor-addressable local data-storage volume;

selecting a predetermined one of said physical volumes in said third set and mounting the selected physical volume in one of said media devices and mounting said transfer physical volume in a second media device;

copying said predetermined one host-processor-addressable logical data-storage volume from said transfer physical volume to said predetermined one physical volume in said third set;

moving said predetermined one host-processor-addressable physical volume from said first media device to said IO station; and updating the data base to show that said predetermined one of said host-processor-addressable logical data-storage volume is no longer in said peripheral data-storage sub-system nor said transfer physical volume and that said predetermined one host-processor-addressable physical volume is no longer in the peripheral data-storage sub-system.

43. In the method set forth in claim 34, including the steps:

appending data to any data stored in an addressed one of host-processor-addressable logical data-storage volumes residing in a predetermined one of said addressable partitions in a predetermined one of said physical volumes;

writing data into said predetermined one of said addressable partitions for appending data therein; and monitoring in the control means whether or not said predetermined one of said addressable partitions is being filled with data for writing data near an end of said predetermined one of said addressable partitions; and upon detecting that said addressable partition is almost full of data, stopping writing.

44. The method set forth in claim 43 wherein said physical volumes movably contain data-storage tapes, respectively, said addressable partitions being identified by a respective physical displacement of the respective partitions from a beginning of tape, including the steps:

during said writing, measuring displacement of tape with respect to an end of said addressed partition for generating an approach indication;

responding to said approach indication to indicate to the attachment means that the writing is aborted;

responding in the attachment means to said aborted writing to stop all data transfers and to then initiate rewriting the data to be appended;

assigning a second host-processor-addressable logical data-storage volume for storing said data to be appended; and storing said data to be appended in said second host-processor-addressable logical data-storage volume.

45. The method set forth in claim 43, wherein each of said physical volumes movably mount a data-storage medium, said storage medium being an elongated flexible magnetic data-storage tape, each of said media devices having medium displacement detecting and indicating means for detecting and indicating displacement of said tape of a physical volume mounted therein from a medium reference position, said detecting and indicating means indicating said displacement in segments of said magnetic tape, said segments being predetermined longitudinal displacements in each said tape from said medium reference position, said longitudinal displacements giving said segments predetermined sizes, respectively, said data recorded on the medium arranged in blocks, including the steps:

during said writing, measuring displacement of said tape with respect to an end of said addressed partition for generating an approach indication;

responding to said approach indication to indicate to the attachment means that the writing is aborted;

selecting another tape including mounting said another tape on a tape drive; and recording said data to be appended on said another tape.

46. The method set forth in claim 34 wherein each of said physical volumes movably mount a data-storage medium, said storage medium being an elongated flexible magnetic data-storage tape, each of said media devices having medium displacement detecting and indicating means for detecting and indicating displacement of said tape of a physical volume mounted therein from a medium reference position, said detecting and indicating means indicating said displacement in segments of said magnetic tape, said data recorded on the medium arranged in blocks, each block having a block ID;

mounting a physical medium in one of said media devices;

detecting and indicating a block ID of a data block recorded in a given one of said host-processor-addressable logical data-storage volumes in said mounted physical volume, reading and storing the block ID in said listing;

in said detecting and indicating means, detecting and indicating a displacement of said recorded block from said reference position as being in one of said segments;

in said control means storing said indicated displacement in said listing with said block ID; and supplying said block ID, said indicated displacement of said recorded block and identification of said mounted physical medium to the attachment means.

47. The method set forth in claim 46, including the steps:

in said control means creating each one of said partitions as an integral number of contiguous ones of said segments;

recording in said physical volume a format identification mark that identifies that the physical volume will receive and store one or more first predetermined host-processor-addressable logical data-storage volumes including indicating that each one of said partitions and a location of said partitions as indicated in segments; and recording in respective ones of said partitions that receive and store respective ones of said first predetermined host-processor-addressable logical data-storage volumes to record in said respective partitions a format identification mark that indicates a respective one of said first predetermined host-processor-addressable logical data-storage volumes.

48. The method set forth in claim 46, including the steps:

in said control means, clustering a plurality of said segments into said media device addressable partitions, respectively; and in said control means assigning predetermined ones of said host-processor-addressable logical data-storage volumes to contiguous ones of said partitions on said magnetic tape.

49. The method set forth in claim 48, including the steps:

in said control means, clustering a fixed number of said segments in each of said partitions in first predetermined ones of said physical volumes; and in said control means clustering a variable number of said segments in each of said partitions in second predetermined ones of said physical volumes such that said assigned host-processor-addressable logical data-storage volumes in each of said second predetermined ones of the physical volumes can have different data-storage capacities.

50. The method set forth in claim 48 wherein said magnetic tape having a plurality of data-storage tracks arranged in a serpentine pattern such that a forward tape scanning direction in a first subset of the data-storage tracks is from a free end of said magnetic tape to a hub end of said magnetic tape mounted on a reel of tape and a forward tape scanning direction in a second subsystem of the data-storage tracks if from said hub end toward said free end, said first and second subsets including tracks in a respective half-wraps that are interleaved across the magnetic tape laterally to the longitudinal length of the magnetic tape such that scanning the first subset of data-storage tracks, including the steps;

in said detecting and indicating means, counting said partitions in a first direction of count and scanning the second subset of data-storage track results in counting said partitions in a second direction of count that is reverse to said first direction, one of said directions of count being an ascending count.

51. The method set forth in claim 48, including the steps:

appending data to data stored in an addressed one of said host-processor-addressable logical data-storage volumes residing in a first predetermined one of said partitions of one of the physical volumes;

writing data into said addressed one of said host-processor-addressable logical data-storage volumes;

in said control means, monitoring said displacement of said magnetic tape past a transducer in one of said media devices; in said control means, responding to said monitoring for indicating writing data near an end of said predetermined partition;

in said control means, responding to said indicating an approach of one end of said predetermined partition to signal the attachment means to abort said writing;

in said attachment means, responding to said aborted writing to stop all data transfers that supply data to be written to said first predetermined host-processor-addressable logical data-storage volume;

in said attachment means, initiating rewriting the data to be appended;

in said control means, delaying said rewriting until a partition having a greater data storing capacity is created;

during said delaying, moving the addressed host-processor-addressable logical data-storage volume to another physical volume including allocating a greater extent of said tape in a second partition for said first predetermined host-processor-addressable logical data-storage volume;

in the control means, updating said listing to reflect moving said addressed host-processor-addressable logical data-storage volume to said another physical volume; and then, in said control means removing said delaying for transferring data from the attachment means to said second physical volume to write said data to be appended in said addressed host-processor-addressable logical data-storage volume residing in said another physical volume.

52. The method set forth in claim 51 wherein the segment sizes vary in size between first and second ends of the tape, said segment sizes increasing in length in a direction from the first toward the second ends, including the step:

selecting said second partition in said second physical volume to be closer to said second end of the tape than the first partition is from the second end of the tape in said first physical volume.

53. The method set forth in claim 51, wherein said physical volumes movably contain data-storage tapes, each of said addressable partition being identified by physical displacement of the respective partition from a beginning of tape, including the steps:

during said writing, measuring displacement of tape with respect to an end of said addressed partition for generating an approach indication;

responding to said approach indication to indicate to the attachment means that the writing is aborted;

responding in the attachment means to said aborted writing to stop all data transfers and to then initiate rewriting the data to be appended;

assigning a second host-processor-addressable logical data-storage volume for storing said data to be appended; and storing said data to be appended in said second host-processor-addressable logical data-storage volume.

54. The method set forth in claim 34, including the steps:

in said listing, indicating one or more categories for each of said host-processor-addressable logical data-storage volumes;

in said mount command indicating a category for said mount command identified host-processor-addressable data-storage volume, in said category indication indicating a predetermined attribute of said command identified host-processor-addressable data-storage volume;

in said listing, identifying ones of said physical volumes that include a host-processor-addressable logical data-storage volume having said mount command indicated category and for selecting said second physical volume for mounting in said addressed media device; and in said listing, maintaining indications that including a stack category for indicating erased physical volumes that are to store a plurality of said host-processor-addressable logical data-storage volumes, a scratch category for indicating erased physical volumes that are to store a single host-processor-addressable data storage volume; physical volumes that are storing one of said host-processor-addressable data-storage volumes and that was previously had a scratch category and physical volumes that are in a partition category that respectively are storing one or more of said a plurality of said host-processor-addressable logical data-storage volumes.

55. The method set forth in claim 54, including the steps;

in said listing maintaining two affinity categories;

maintaining a first affinity category indicating that a minimal number of said host-processor-addressable logical data-storage volumes are to reside in each of said plurality of physical volumes having ones of said host-processor-addressable logical data-storage volumes residing therein;

in said control means, responding to a said mount command indicating said first affinity category for selecting one of said plurality of said physical volumes that includes a minimal number of said host-processor-addressable logical data-storage volumes having said first affinity category for receiving and storing said mount command indicated host-processor-addressable logical data-storage volume;

maintaining a second affinity category for indicating that a maximal number of said host-processor-addressable logical data-storage volumes are to reside in a minimal number of said plurality of physical volumes; and in said control means, responding to a said mount command indicating said second affinity category for selecting a second one of said plurality of said physical volumes that includes a maximal number of said host-processor-addressable logical data-storage volumes having said second affinity category for receiving and storing said mount command indicated host-processor-addressable logical data-storage volume.

56. The method set forth in claim 34 wherein said peripheral data storage subsystem has an automatic media library, said automatic media library being connected to said control means, to said media devices and to said attachment means for responding to said control means for fetching and storing ones of said physical volumes as attachment means addressed ones of said host-processor-addressable logical data-storage volumes, said automatic media library having addressable storage compartments for said physical volumes, an IO station in the media library; and in said automatic media library, responding to selecting physical volumes in said control means for transporting ones of said physical volumes between said compartments, said media devices and said IO station.

57. The method set forth in claim 34, including the steps:

providing a dedicated media device that is addressable only by said control means and not by said attachment means;

copying a predetermined one of the host-processor-addressable logical data-storage volumes from a first physical volume mounted on one of said media devices addressed by said attachment means to a second physical volume mounted in said dedicated media device; and in said listing, updating the listing to reflect that said predetermined one of the host-processor-addressable logical data-storage volumes no longer resided in said first physical volume mounted on said one of said media devices addressed by said attachment means but resides in second physical volume mounted in said dedicated media device.

58. The method set forth in claim 34, including the steps:

in host processors attached to said attachment means, creating and maintaining a system volume catalog of said host-processor-addressable logical data-storage volumes that includes a plurality of said volume serial numbers for said host-processor-addressable logical data-storage volumes including volume serial numbers that identify no initialized host-processor-addressable logical data-storage volumes in the peripheral data storage subsystem, selecting said maintained serial numbers in said system volume catalog to implicitly indicate predetermined categories of said host-processor-addressable logical data-storage volumes.

59. The method set forth in claim 34 wherein each said physical volume has a relatively movable magnetic tape, each said media devices having tape displacement measuring means that measure reel rotations for indicating tape displacement, each tape having segments identifiable by said tape displacement measuring means, said magnetic tape having a plurality of longitudinally extending data storage tracks arranged in a serpentine pattern such that a forward tape scanning direction in a first subset of the data storage tracks is from a free end of said magnetic tape to a hub end of said magnetic tape and a forward tape scanning direction in a second subset of the data storage tracks if from said hub end toward said free end, said first and second subsets including tracks in a respective half-wraps that are interleaved across the magnetic tape laterally to the longitudinal length of the magnetic tape, including the steps:

in said control means, clustering a plurality of said segments into media device addressable partitions;

assigning predetermined ones of said host-processor-addressable logical data-storage volumes to respective predetermined ones of said partitions;

in said peripheral controller means, counting said segments in a first direction of count and scanning the second subset of data storage track results in counting said segment in a second direction of count that is reverse to said first direction, one of said directions of count being an ascending count;

in said listing, indicating the volume mapping in the apparatus, in said listing establishing and maintaining for each host-processor-addressable logical data-storage volume for indicating:

said respective volume serial number for each said host-processor-addressable logical data-storage volume, identification of the physical volume in which the host-processor-addressable logical data storage-volume resides and the current location of each said physical volume;

status of each host-processor-addressable logical data-storage volume as to whether or not the host-processor-addressable logical data-storage volume is mounted in an addressed one of said media devices or that a request to mount has been received;

identifications of the starting and ending segments of the magnetic tape for each said partition in which the host-processor-addressable logical data-storage volume resides; and a storage location of the identified physical volume whilst the identified physical volume is demounted from said media devices.

60. Apparatus for storing data in a data-storage sub-system peripherally to a host processor, including, in combination:

attachment means for attaching the apparatus to one or more host processors for receiving commands from an attached host processor, exchanging data with the attached host processor and for supplying status information to the attached host processor;

a plurality of host-processor-addressable media devices in the sub-system, a plurality of magnetic-tape physical volumes in said data-storage sub-System and respectively having volume serial numbers, each said media device capable of mounting for reading and writing to and from one of said magnetic-tape physical volumes, each of said magnetic-tape physical volumes having a magnetic tape record medium;

a plurality host-processor addressable logical data-storage volumes residing in predetermined ones of said magnetic-tape physical volumes;

volume moving means for inserting and removing said magnetic-tape physical volumes into and from said media devices;

volume manager means connected to the attachment means for receiving mount commands from the attached host processor, said mount commands including an address of one of said media devices and one of said volume serial numbers of a predetermined one of said host-processor-addressable logical data-storage volumes to be mounted on said addressed media device, said predetermined one of said host-processor addressable logical data-storage volumes being a mount command addressed host-processor-addressable logical data-storage volume;

peripheral controller means having multi-path data flow means connected to the attachment means and to the media devices for processing digital signals between said attachment means and said media devices;

volume map means connected to the volume manager means for storing identifications of said volume serial numbers and indications of which of said physical volumes contain said host-processor-addressable logical data-storage volumes, respectively;

said volume manager means responding to each of said received mount commands for examining said volume map means for identifying one of said magnetic-tape physical volumes storing said mount command addressed host-processor-addressable logical data-storage volume, first means in the volume manager means for responding to identification of one of said magnetic-tape physical volumes storing said mount command addressed host-processor-addressable logical data-storage volume for effecting mounting of one of said magnetic-tape physical volumes on said addressed media device; and second means in the volume manager means for responding to identification of not any of said magnetic-tape physical volumes storing said mount command addressed host-processor-addressable logical data-storage volume for selecting a second magnetic-tape physical volume, volume initialization means in the second means for automatically establishing a new host-processor-addressable logical data-storage volume as said host-processor-addressed data-storage volume and for mounting said second magnetic-tape physical volume in said addressed media device, each of said media devices having a magnetic tape medium displacement measuring and indicating means for indicating displacement of said magnetic tape medium of a magnetic-tape physical volume from a magnetic tape reference position that is a beginning of tape immediately adjacent a free end of the magnetic tape and remote from a hub end of the magnetic tape;

said volume moving means moving a first one of said magnetic-tape physical volumes to a first one of said media devices, said first one of said magnetic-tape physical volumes having a first one of said host-processor-addressable logical data-storage volumes therein having a plurality of data blocks, each data block having a block ID;

said first media device detecting and indicating a given tape displacement location of a given data block having a given block ID;

said peripheral controller means having location means for reading said given block ID of said given data block on said tape magnetic tape physical volume and addressable in said first one of said host-processor-addressable logical data-storage volumes;

in said location means, supplying said given block ID and said given tape displacement location to said attachment means for transmittal to one of said host processors;

said volume manager means commanding mounting a second magnetic tape physical volume in said second media device;

in said first and second media devices and in said data flow means copying said first host-processor-addressable logical data-storage volume from said first magnetic-tape physical volume to said second magnetic-tape physical volume including recording said first host-processor-addressable logical data-storage volume beginning at a new tape displacement location in said second magnetic-tape physical volume that is different from said given tape displacement location of said first physical volume;

locate command means for supplying a host processor issued locate command for said given data block including identifying said given block ID, said given tape location and identifying said first host-processor-addressable logical data-storage volume on said second physical volume;

said volume manager means having locate means responding to said locate command for accessing said volume map means for determining that said first host-processor-addressable logical data-storage volume resides in said second magnetic tape physical volume;

said locate means having adjustment means for changing the given tape location indicated in the locate command to said different position on said second physical volume including arithmetically differencing a beginning physical position of said one host-processor-addressable logical data-storage volume in said first and second physical volumes and arithmetically changing the memorized location by arithmetically combining said difference and said memorized location; and said peripheral controller means actuating said second media device for moving the magnetic tape of the second physical volume to said changed location for accessing said given data block.

61. A method of operating a peripheral data-storage sub-system, programmed control means in the peripheral data-storage sub-system for controlling its operation and attachment means connected to the control means for attaching the data-storage sub-system to a host processor, a plurality of addressable media devices for removably receiving physical volumes of media, means connected to the control means and to the media devices for mounting and demounting said physical volumes of media on and from said media devices, said media devices being connected to the attachment means for exchanging data signals therewith, the method including the steps:

establishing in the control means a plurality of volume serial numbers;

establishing a listing in said control means containing indications of a first set having a plurality of first ones of said volume serial numbers that are to be used only for identifying host-processor-addressable logical data-storage volumes and establishing a second set of second ones of said volume serial numbers that are to be used only to identify stack ones of said physical volumes in which said host-processor-addressable logical data-storage volumes can reside;

establishing in the listing a plurality of affinity categories, establishing a first one of said affinity categories for dispersing said host-processor-addressable logical data-storage volumes having said first one affinity among a maximal number of said physical volumes and establishing a second one of said affinity categories for clustering said host-processor-addressable logical data-storage volumes having said second one affinity category;

initializing predetermined ones of said host-processor-addressable logical data-storage volumes including first allocating a predetermined partition of predetermined ones of said physical volumes for respective ones of said host-processor-addressable logical data-storage volumes and establishing addressability of said host-processor-addressable logical data-storage volumes by inserting respective ones of said volume serial numbers of said first set in said host-processor-addressable logical data-storage volumes on respective ones of said physical volumes, including initializing fewer of said host-processor-addressable logical data-storage volumes that the number of said established first volume serial numbers;

in said control means, listing said initialized host-processor-addressable logical data-storage volumes having said first volume serial numbers, respectively, and identifying, respectively, said initialized ones of said host-processor-addressable logical data-storage volumes and said physical volumes in which the respective logical data-storage volume reside;

in said listing, assigning first and second predetermined ones of said predetermined initialized host-processor-addressable logical data-storage volumes respectively to said first and second affinity categories;

in said attachment means, receiving a mount command from an attached host processor and supplying the received mount command to said control means, including in said mount command identifications of an addressed one of said media devices, an addressed one of said volume serial numbers and one of said affinity categories;

in said control means checking said listing for determining whether or not an initialized one of said host-processor-addressable logical data-storage volumes is identified by said addressed one of said volume serial numbers, if said checking shows that no initialized logical data-storage volume is identified by said addressed one of said volume serial numbers;

then if said one of said affinity categories is said first affinity category, then selecting, as a selected one physical volume, one of said physical volumes having a minimal number of said host-processor-addressable logical data-storage volumes assigned to said first affinity category to the mount-command-identified affinity category and one of second volume serial numbers;

otherwise, if said one of said affinity categories is said second affinity category, then selecting one of said physical volumes, as said selected one physical volume, having a maximal number of said host-processor-addressable logical data-storage volumes assigned to the mount-command-identified affinity category, that has data storage space for said host-processor-addressable logical data-storage volume and that has one of second volume serial numbers;

mounting said selected one physical volume in said addressed media device;

then, in said control means allocating a predetermined addressable partition of said mounted physical volume for receiving and storing said one host-processor-addressable logical data-storage volume having said addressed volume serial number and then recording in said allocated partition of said selected physical volume said addressed volume serial number such that said allocated partition is addressable as an initialized logical data-storage volume by said address volume serial number;

then, in said listing, updating said listing for showing that said addressed volume serial number identifies said one logical data-storage volume and that said one logical data-storage volume resides in said selected physical volume;

if said addressed volume serial number is identified in said listing, then selecting a second one of said physical volumes identified in said listing by said addressed volume serial number for mounting in said addressed media device;

then mounting said second selected physical volume in said addressed media device as being said logical data-storage volume; and if said checking shows that the addressed serial number is not a volume serial number in said first plurality of serial numbers, rejecting the received mount command as not identifying any data-storage volume, including if said received mount command identifies a volume serial number in said second plurality of volume serial numbers.

62. A method of operating a peripheral data-storage sub-system, programmed control means in the peripheral data-storage sub-system for controlling its operation, attachment means connected to the control means for attaching the sub-system to a host processor, a plurality of addressable media devices for removably receiving physical volumes of media, means connected to the control means and to the media devices for mounting and demounting said physical volumes of media, said media devices being connected to the attachment means for exchanging data signals therewith, the method including steps:

establishing a plurality of volume serial numbers;

establishing a listing in said control means containing indications of a first set having a plurality of first ones of said volume serial numbers that are to be used only for identifying host-processor-addressable logical data-storage volumes, establishing a second set of second ones of said volume serial numbers that are to be used only to identify stack ones of said physical volumes in which said host-processor-addressable logical data-storage volumes can reside;

initializing predetermined ones of said host-processor-addressable logical data-storage volumes including first allocating a predetermined partition of predetermined ones of said physical volumes for respective ones of said host-processor-addressable logical data-storage volumes and establishing addressability of said host-processor-addressable logical data-storage volumes by inserting respective ones of said volume serial numbers of said first set in said host-processor-addressable logical data-storage volumes on respective ones of said physical volumes, including initializing fewer of said host-processor-addressable logical data-storage volumes that the number of said established first volume serial numbers;

in said control means, listing said initialized host-processor-addressable logical data-storage volumes having said first volume serial numbers, respectively, and identifying, respectively, said initialized ones of said host-processor-addressable logical data-storage volumes and said physical volumes in which the respective logical data-storage volume reside;

establishing in said control means for use in said listing a plurality of volume control categories including a stack category for indicating erased physical volumes that are to store a plurality of said host-processor-addressable logical data-storage volumes, a scratch category for indicating erased physical volumes that are to store a single host-processor-addressable logical data-storage volume; physical volumes that are storing one of said host-processor-addressable logical data-storage volumes in a unitary category and that was previously had a scratch category and physical volumes that are in a partition category that respectively are storing one or more of said a plurality of said host-processor-addressable logical data-storage volumes that were in said stack category;

receiving a mount command from an attached host processor into said control means that includes an address of one of said media devices and an addressed volume serial number wherein said addressed volume serial number has a value respectively indicating that the addressed volume serial number identified host-processor-addressable logical data-storage volumes is to be or is stored in a physical volume either in said stack or partition categories or in said scratch and unitary categories;

in said control means checking said listing for determining whether or not an initialized one of said host-processor-addressable logical data-storage volumes is identified by said addressed volume serial number;

if said checking shows that no initialized logical data-storage volume is identified by said addressed volume serial number, then selecting one of said physical volumes, as a selected one physical volume, in said stack or scratch category indicated by said mount command identified volume serial number for receiving said addressed host-processor-addressable logical data-storage volume;

mounting said selected one physical volume in said addressed media device as mounted physical volume;

then, allocating a predetermined addressable partition of said mounted physical volume for receiving and storing a host-processor-addressable logical data-storage volume having said addressed volume serial number and then recording in said allocated partition of said selected physical volume said addressed volume serial number such that said allocated partition is addressable as an initialized logical data-storage volume by said addressed volume serial number;

then, updating said listing for showing that said addressed volume serial number identifies said one logical data-storage volume and that said one logical data-storage volume resides in said selected physical volume;

if said addressed volume serial number is identified in said listing, then selecting a second one of said physical volumes, as a second selected physical volume, identified in said listing by said addressed volume serial number for mounting in said addressed media device;

then, mounting said second selected physical volume in said addressed media device; and if said checking shows that the addressed serial number is not a volume serial number in said first plurality of serial numbers, rejecting the received mount command as not identifying any data-storage volume, including if said received mount command identifies a volume serial number in said second plurality of volume serial numbers.

63. A program product for operating a peripheral data-storage sub-system, programmed control means in the peripheral data-storage sub-system for controlling its operation and attachment means connected to the control means for attaching the sub-system to a host processor, a plurality of addressable media devices for removably receiving physical volumes of data-storage media, means connected to the control means and to the media devices for mounting and demounting said physical volumes of data-storage media, said media devices being connected to the attachment means for exchanging data signals therewith;

said program product comprising data storage means having machine-sensible program instructions, including:

program instructions for establishing a plurality of volume serial numbers;

program instructions for establishing a listing in said control means containing indications of a first set having a plurality of first ones of said volume serial numbers that are to be used only for identifying host-processor-addressable logical data-storage volumes and for establishing a second set of second ones of said volume serial numbers that are to be used only to identify stack ones of said physical volumes in which said host-processor-addressable logical data-storage volumes can reside;

program instructions for first initializing first predetermined ones of said host-processor-addressable logical data-storage volumes including first allocating a predetermined partition of predetermined ones of said physical volumes for respective ones of first predetermined ones of said host-processor-addressable logical data-storage volumes and establishing addressability of said first predetermined ones of said host-processor-addressable logical data-storage volumes by inserting predetermined respective ones of said volume serial numbers of said first set in said host-processor-addressable logical data-storage volumes on respective ones of said predetermined ones of said physical volumes, said first predetermined ones of said host-processor-addressable logical data-storage volumes being fewer than a number of said established first volume serial numbers;

program instructions for establishing, in said control means, a listing said first predetermined ones of said host-processor-addressable logical data-storage volumes having said first volume serial numbers, respectively, and identifying, respectively, said first predetermined ones of said host-processor-addressable logical data-storage volumes and said physical volumes in which the respective first predetermined ones of said host-processor-addressable logical data-storage volumes reside;

program instructions for actuating said control means to receive a mount command from an attached host processor into said control means that includes an addressed of one of said media devices and an addressed volume serial number, in said control means checking said listing for determining whether or not a first predetermined one of said host-processor-addressable logical data-storage volumes is identified by said addressed volume serial number, if said checking shows that none of said first predetermined ones of said host-processor-addressable logical data-storage volumes is identified by said addressed volume serial number, then selecting one of said physical volumes having one of said second volume serial numbers for identifying in said listing said selected one physical volume by said addressed volume serial number in addition to said one second volume serial number;

program instructions for actuating said control means to mount said selected one physical volume in said addressed media device;

program instructions for actuating said control means to allocate a predetermined addressable partition of said selected one physical volume for receiving and storing a host-processor-addressable logical data-storage volume having said addressed volume serial number and then recording in said allocated partition of said selected physical volume said addressed volume serial number such that said allocated partition is addressable as an initialized one host-processor-addressable logical data-storage volume by said addressed volume serial number;

program instructions for actuating said control means to then record in said selected one physical volume an index to said one host-processor-addressable logical data-storage volume that includes an address of said allocated addressable partition whereby said one host-processor-addressable logical data-storage volume is initialized;

program instructions for actuating said control means to then update said listing for showing that said addressed volume serial number identifies said one logical data-storage volume and that said one logical data-storage volume resides in said selected physical volume;

program instructions for actuating said control means if said addressed volume serial number is identified in said listing to then select a second one of said physical volumes identified in said listing by said addressed volume serial number for mounting in said addressed media device;

program instructions for actuating said control means to then mount said first selected physical volume in said addressed media device as being said logical data-storage volume; and program instructions responsive to said checking showing that the addressed volume serial number is not a volume serial number in said first plurality of serial numbers, then actuating said control means to reject the received mount command as not identifying any one of said host-processor-addressable logical data-storage volumes, including if said received mount command identifies a volume serial number in said second plurality of volume serial numbers.

64. A program product having program instructions for operating a peripheral data-storage sub-system, programmed control means in the peripheral data-storage sub-system for controlling its operation and attachment means connected to the control means for attaching the data-storage sub-system to a host processor, a plurality of addressable media devices for removably receiving physical volumes of media, means connected to the control means and to the media devices for mounting and demounting said physical volumes of media on and from said media devices, said media devices being connected to the attachment means for exchanging data signals therewith said program product comprising a data storage means having machine-sensible program instructions, including:

program instructions for establishing in the control means a plurality of volume serial numbers;

program instructions for establishing a listing in said control means containing indications of a first set having a plurality of first ones of said volume serial numbers that are to be used only for identifying host-processor-addressable logical data-storage volumes and establishing a second set of second ones of said volume serial numbers that are to be used only to identify stack ones of said physical volumes in which said host-processor-addressable logical data-storage volumes can reside;

program instructions for establishing in the listing a plurality of affinity categories, establishing a first one of said affinity categories for dispersing said host-processor-addressable logical data-storage volumes having said first one affinity among a maximal number of said physical volumes and establishing a second one of said affinity categories for clustering said host-processor-addressable logical data-storage volumes having said second one affinity category;

program instructions for initializing predetermined ones of said host-processor-addressable logical data-storage volumes including first allocating a predetermined partition of predetermined ones of said physical volumes for respective ones of said host-processor-addressable logical data-storage volumes and establishing addressability of said host-processor-addressable logical data-storage volumes by inserting respective ones of said volume serial numbers of said first set in said host-processor-addressable logical data-storage volumes on respective ones of said physical volumes, including initializing fewer of said host-processor-addressable logical data-storage volumes that the number of said established first volume serial numbers;

program instructions for identifying in said listing said initialized host-processor-addressable logical data-storage volumes having said first volume serial numbers, respectively, and identifying, respectively, said initialized ones of said host-processor-addressable logical data-storage volumes and said physical volumes in which the respective logical data-storage volume reside;

program instructions for actuating said control means to assign, in said listing, first and second predetermined ones of said predetermined initialized host-processor-addressable logical data-storage volumes respectively to said first and second affinity categories;

program instructions for actuating said control means to receive, via said attachment means, a mount command from an attached host processor and supplying the received mount command to said control means, including in said mount command identifications of an addressed one of said media devices, an addressed one of said volume serial numbers and one of said affinity categories;

program instructions for actuating said control means to check said list for determining whether or not an initialized one of said host-processor-addressable logical data-storage volumes is identified by said addressed one of said volume serial numbers, program instructions for actuating said control means, if said checking shows that no initialized logical data-storage volume is identified by said addressed one of said volume serial numbers to check if said one of said affinity categories is said first affinity category to select, s a selected one physical volume, one of said physical volumes having a minimal number of said host-processor-addressable logical data-storage volumes assigned to said first affinity category to the mount-command-identified affinity category and one of second volume serial numbers;

program instructions for otherwise actuating said control means if said one of said affinity categories is said second affinity category to select one of said physical volumes, as said selected one physical volume, having a maximal number of said host-processor-addressable logical data-storage volumes assigned to the mount-command-identified affinity category, that has data storage space for said host-processor-addressable logical data-storage volume and that has one of second volume serial numbers;

program instructions for actuating said control means to mount said selected one physical volume in said addressed media device;

program instructions for actuating said control means to allocate a predetermined addressable partition of said mounted physical volume for receiving and storing said one host-processor-addressable logical data-storage volume having said addressed volume serial number and then recording in said allocated partition of said selected physical volume said addressed volume serial number such that said allocated partition is addressable as an initialized logical data-storage volume by said address volume serial number;

program instructions for actuating said control means to update said listing for showing that said addressed volume serial number identifies said one logical data-storage volume and that said one logical data-storage volume resides in said selected physical volume;

program instructions responsive to said addressed volume serial number being identified in said listing for actuating said control means to select a second one of said physical volumes identified in said listing by said addressed volume serial number for mounting in said addressed media device;

program instructions for actuating said control means for mounting said second selected physical volume in said addressed media device as being said logical data-storage volume; and program instructions responsive to said checking showing that the addressed serial number is not a volume serial number in said first plurality of serial numbers for actuating said control means to reject the received mount command as not identifying any data-storage volume, including if said received mount command identifies a volume serial number in said second plurality of volume serial numbers.

65. A program-product for operating a peripheral data-storage sub-system, programmed control means in the peripheral data-storage sub-system for controlling operation of the data-storage sub-system having attachment means connected to the control means for attaching the sub-system to a host processor, a plurality of addressable media devices for removably receiving physical volumes of media, transport means connected to said control means and to the media devices for responding to said control means for mounting and demounting said physical volumes of media, said media devices being connected to the attachment means for exchanging data signals therewith;

said program product comprising data storage means having machine-sensible program instructions, including:

program instructions for establishing a plurality of volume serial numbers;

program instructions for establishing a listing in said control means containing indications of a first set having a plurality of first ones of said volume serial numbers that are to be used only for identifying host-processor-addressable logical data-storage volumes, establishing a second set of second ones of said volume serial numbers that are to be used only to identify stack ones of said physical volumes in which said host-processor-addressable logical data-storage volumes can reside;

program instructions for initializing predetermined ones of said host-processor-addressable logical data-storage volumes including first allocating a predetermined partition of predetermined ones of said physical volumes for respective ones of said host-processor-addressable logical data-storage volumes and establishing addressability of said host-processor-addressable logical data-storage volumes by inserting respective ones of said volume serial numbers of said first set in said host-processor-addressable logical data-storage volumes on respective ones of said physical volumes, including initializing fewer of said host-processor-addressable logical data-storage volumes that the number of said established first volume serial numbers;

program instructions for listing said initialized host-processor-addressable logical data-storage volumes having said first volume serial numbers, respectively, and identifying, respectively, said initialized ones of said host-processor-addressable logical data-storage volumes and said physical volumes in which the respective logical data-storage volume reside;

program instructions for establishing in said control means for use in said listing a plurality of volume control categories including a stack category for indicating erased physical volumes that are to store a plurality of said host-processor-addressable logical data-storage volumes, a scratch category for indicating erased physical volumes that are to store a single host-processor-addressable logical data-storage volume; physical volumes that are storing one of said host-processor-addressable logical data-storage volumes in a unitary category and that was previously had a scratch category and physical volumes that are in a partition category that respectively are storing one or more of said a plurality of said host-processor-addressable logical data-storage volumes that were in said stack category;

program instructions for actuating said control means via the attachment means for receiving a mount command from an attached host processor into said control means that includes an address of one of said media devices and an addressed volume serial number wherein said addressed volume serial number has a value respectively indicating that the addressed volume serial number identified host-processor-addressable logical data-storage volumes is to be or is stored in a physical volume either in said stack or partition categories or in said scratch and unitary categories;

program instructions for actuating said programmed control means to check said listing for determining whether or not an initialized one of said host-processor-addressable logical data-storage volumes is identified by said addressed volume serial number;

program instructions for actuating said programmed control means if said checking shows that no initialized logical data-storage volume is identified by said addressed volume serial number, then selecting one of said physical volumes, as a selected one physical volume, in said stack or scratch category indicated by said mount command identified volume serial number for receiving said addressed host-processor-addressable logical data-storage volume;

program instructions for actuating said programmed control means for mounting said selected one physical volume in said addressed media device as a mounted physical volume;

program instructions for then actuating said control means for allocating a predetermined addressable partition of said mounted physical volume for receiving and storing a host-processor-addressable logical data-storage volume having said addressed volume serial number and then recording in said allocated partition of said selected physical volume said addressed volume serial number such that said allocated partition is addressable as an initialized logical data-storage volume by said addressed volume serial number;

program instructions for actuating said control means to then update said listing for showing that said addressed volume serial number identifies said one logical data-storage volume and that said one logical data-storage volume resides in said selected physical volume;

program instructions actuating said programmed control means if said addressed volume serial number is identified in said listing, then selecting a second one of said physical volumes, as a second selected physical volume, identified in said listing by said addressed volume serial number for mounting in said addressed media device;

program instructions for actuating said programmed control means to then mount said second selected physical volume in said addressed media device; and program instructions responding to said checking showing that the addressed serial number is not a volume serial number in said first plurality of serial numbers for actuating said control means to reject the received mount command as not identifying any data-storage volume, including if said received mount command identifies a volume serial number in said second plurality of volume serial numbers.

* * * * *